United States Patent [19]

Wudl et al.

[11] Patent Number: 4,772,940
[45] Date of Patent: Sep. 20, 1988

[54] POLYMER HAVING ISOTHIANAPHTHENE STRUCTURE AND ELECTROCHROMIC DISPLAY

[75] Inventors: Fred Wudl; Alan Heeger, both of Santa Barbara, Calif.; Masao Kobayashi, Kanagawa, Japan

[73] Assignee: Regents of the University of California, Berkeley, Calif.

[21] Appl. No.: 937,115

[22] Filed: Dec. 2, 1986

Related U.S. Application Data

[63] Continuation-in-part of Ser. No. 736,984, May 22, 1985, Pat. No. 4,640,748, which is a continuation-in-part of Ser. No. 634,805, Jul. 26, 1984, abandoned.

[51] Int. Cl.$^4$ .............................................. H04N 9/30
[52] U.S. Cl. ...................................... 358/59; 358/902; 136/263; 429/111; 429/122; 429/128; 204/290 R; 204/291
[58] Field of Search ............. 204/290 R, 291; 358/59, 358/902; 429/111, 122, 128; 136/263

[56] References Cited

U.S. PATENT DOCUMENTS

| | | | |
|---|---|---|---|
| 2,552,679 | 5/1951 | Koft, Jr. | 260/42 |
| 2,658,902 | 11/1983 | Johnson | 260/329 |
| 3,524,835 | 8/1970 | Edmonds, Jr. | 260/79.1 |
| 3,574,072 | 4/1971 | Louvar | 204/72 |
| 3,585,163 | 6/1971 | Neale et al. | 260/47 |
| 3,615,384 | 10/1971 | Gipstein et al. | 96/1 R |
| 3,725,362 | 4/1973 | Walker | 260/79 |
| 3,775,368 | 11/1973 | Leslie et al. | 260/49 |
| 4,111,857 | 9/1978 | Engler et al. | 528/226 |
| 4,395,497 | 7/1983 | Naarmann et al. | 136/263 |
| 4,461,691 | 7/1984 | Frank | 204/242 |
| 4,640,748 | 2/1987 | Wüdl | 204/59 R |

OTHER PUBLICATIONS

Diaz, A. F. and J. A. Logan, J. Electroanal. Chem. 111:111–114, (1980).
Druy, M. A. and R. J. Seymour, Journal de Physique C3(6):595–598, (1983).
Genies, E. M. and G. Bidan, J. Electroanal. Chem. 149:101–113, (1983).

Primary Examiner—R. L. Andrews
Attorney, Agent, or Firm—Ciotti & Murashige Irell & Manella

[57] ABSTRACT

An electrochromic display device is provided in which a high molecular weight conductive membrane is formed on a conductive, transparent base, and an opposing electrode is arranged thereunder via a liquid electrolyte. The conductive, electrochromic membrane is a polyisothianaphthene, a chemically and physically stable material which gives the device superior electrochromic switching characteristics, including a fast response time and a high contrast color change upon oxidation and reduction. Other applications which rely on the electrochromic properties of the polyisothianaphthene are disclosed as well.

25 Claims, 15 Drawing Sheets

ELECTROCHEMICAL REVERSIBILITY OF A POLY(ISOTHIANAPHTHENE) FILM RECORDED RELATIVE TO STANDARD CALOMEL ELECTRODE (SCE). + 0.6 = YELLOW, TRANSPARENT; -0.4 V = BLUE-BLACK OPAQUE; $Li^+BF_4^-$ IN PROPYLENE CARBONATE, ELECTROLYTE. THE OXIDIZED POLYMER IN THIS EXAMPLE CONTAINS $BF_4^-$ AS THE DOPANT.

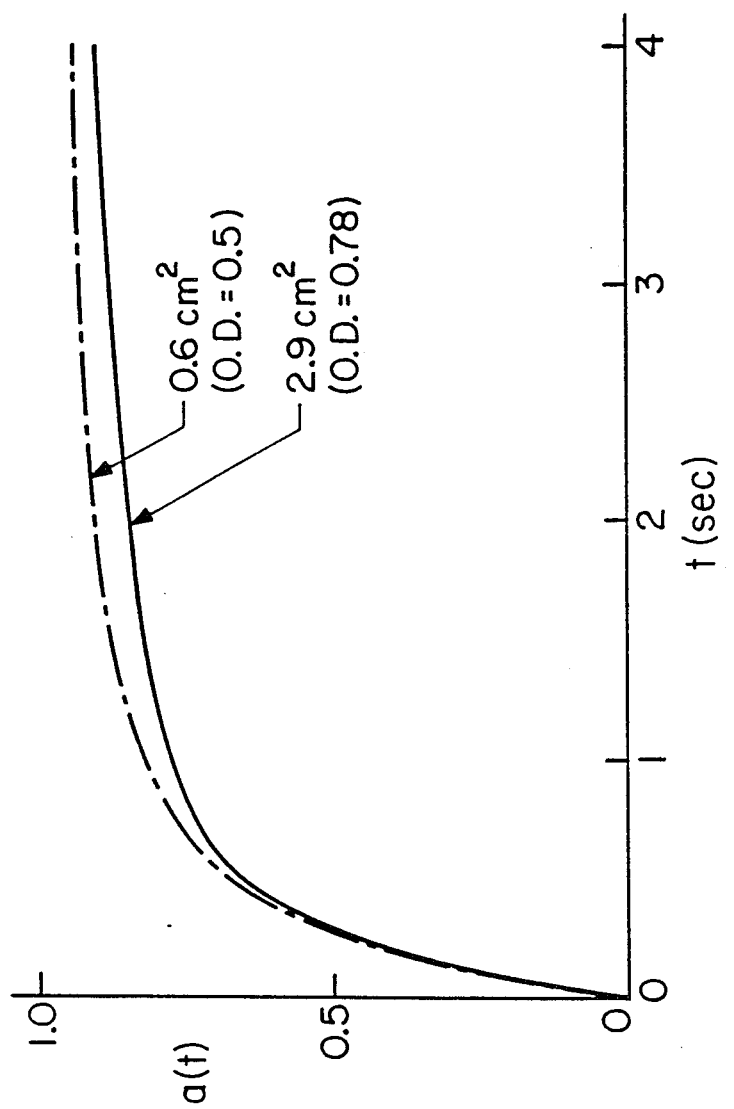

POLYMER HAVING ISOTHIANAPHTHENE STRUCTURE AND ELECTROCHROMIC DISPLAY

CROSS-REFERENCE TO RELATED APPLICATIONS

This is a continuation-in-part application of U.S. application Ser. No. 736,984, filed May 22, 1985, now U.S. Pat. No. 4,640,748, which is a continuation-in part of U.S. application Ser. No. 634,805, filed July 26, 1984 and now abandoned.

BACKGROUND OF THE INVENTION

1. Field of the Invention

This invention relates generally to electrochromic displays, and in particular relates to the use of polyisothianaphthene (PITN) polymer membranes in electrochromic displays.

2. Description of the Prior Art

With the latest remarkable developments in lightening, thinning or miniaturization of electric and electronic instruments, not only lightening, thinning or miniaturization of various conductive materials used therein but also new development of these material per se have been desired.

Various sulfur-containing heterocyclic polymers are known including polymers from thiophene, U.S. Pat. Nos. 2,552,796 and 2,658,902; polymers from dibenzothiophene, U.S. Pat. No. 3,585,163; polymers from vinyl bithiophene, U.S. Pat. No. 3,615,384; polymers from various substituted thiophenes, U.S. Pat. No. 3,725,362; polymers from 2-bromo-8-hydroxy-5,5-dioxodibenzothiophene, U.S. Pat. No. 3,775,368; and polymers from tetrathiapentalene, U.S. Pat. No. 4,111,857.

Within the rapidly expanding field of polymeric conductors ("Proceedings of the International Conference on the Physics and Chemistry of Polymeric Conductors", *J. Physigue. Colloque.*, (1983), C-3), the poly(-heterocycles) have received attention because they are easily prepared in film form and are considerably more stable to atmospheric exposure than polyacetylene or polyphenylene. For use in stabilizing a semiconductor surface, see R. Noufi et al., *J. Amer. Chem. Soc.*, (1981), Vol. 183, 184 and references therein. A further extension of this work is our recent entry into the study of polythiophene.

Extensive investigations on new conductive polymers have been conducted. For example, polyacetylenes are under investigation for possible availability as electrode materials of secondary batteries since they show conductivities as high as $10^2$ to $10^3$ S/cm when doped with iodine or arsenic pentafluoride (cf. *Synthetic Metals*, Vol. 1, No. 2, 101 (1979/1980)). These polymers also display excellent charge-discharge characteristics. Use of polyacetylenes in solar batteries is also under investigation because of the polymers' light absorption characteristics which are close to those of sunlight. However, the polyacetylenes are disadvantageous in that they are per se susceptible to oxidation and doped polyacetylenes are extremely sensitive to humidity.

Polythiophenes have been studied not only as conductive materials and as battery electrode materials, but also as electrochromic materials making use of color changes in a doped state. For example, A. M. Druy, et al reported that 2,2'-bithienyl may be electrochemically polymerized to form a polymer having a color which reversibly varies from blue in an oxidized state to red in a reduced state, thus a potentially useful electrochromic material [cf. *Journal de Physioue*, Vol. 44, No. 6, C3-595 (1983)]. However, polythiophenes, like polyacetylenes, are generally sensitive compounds.

In light of the above-described problems, the present inventors have conducted extensive investigations into conductive polymers and uses thereof, and, as a result, have found that a polymer having an isothianaphthene structure (Formulae A-D) is a very stable compound which is capable of continuously and reversibly varying its color in the course of oxidation or reduction. These novel polymers, which display conductivities higher than about $10^{-2}$ S/cm upon doping with general dopants, are described in U.S. application Ser. No. 736,984 filed May 22, 1985, now issued as U.S. Pat. No. 4,640,748 (the parent hereto), the disclosure of which is hereby incorporated by reference in its entirety. Preferred methods of making such polymers are set forth in that patent disclosure as well.

While not wishing to be bound by any particular theory, we believe that polyisothianaphthene, a polymer of a "nonclassical" thiophene, exhibits greater stability and perhaps conductivity than polythiophene because the resonance contributors represented by Formula C and Formula D provide for stabilization of the structure as well as delocalization along the backbone.

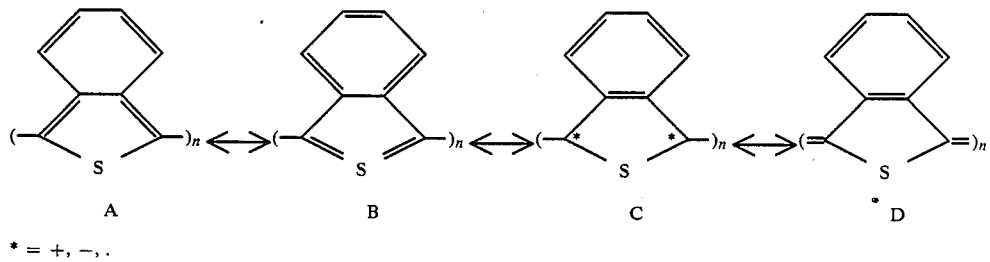

A   B   C   D

\* = +, −, .

We have found that the most desirable approach to polyisothianaphthene is through the electrochemical coupling of isothianaphthene. The isothianaphthene monomer may be prepared according to the methods set forth in J. A. Gadysz et al., *Tetrahedron,* (1979) Vol. 35, 2239; M. P. Cava et al., *J. Amer. Chem. Soc.*, (1959), Vol 81, 4266; M. P. Cava et al., *J. Org. Chem.*, (1971) Vol. 36, 3932. See, e.g., U.S. application Ser. No. 736,984, cited supra and previously incorporated by reference.

Because polyisothianaphthenes are very stable and exhibit extremely rapid p-type electrochemical doping characteristics with an associated high contrast color change, many applications of the polymers are clearly feasible. One application—use in electrochromic displays—is made possible by virtue of the fact that polyisothianaphthene is a transparent, as well as conductive, polymer. After doping, a thin film of PITN has a very low optical density in the visible portion of the spectrum, as will be demonstrated herein. Other applications which make use of the opto-electrochemical properties of the novel polymers are encompassed by the present invention as well, e.g., use of PITN on or as an electrode in a battery or electrochemical cell, use in a solar energy conversion device, and general use as (or in) electrochromic material.

In a number of ways, electrochromic displays represent an improvement over liquid crystal devices which have recently been developed as "low-energy" display devices with, potentially, a wide range of applications. The display in liquid crystal devices is dependent on visual angle and the contrast and resolution are typically relatively poor. No memory function is provided, nor can the display be provided over a large surface area. In order to eliminate these disadvantages, studies have been extensively conducted on low-energy electrochromic display (ECD) devices which make use of a material's electrochromic properties, i.e., electrochromic materials have light absorption characteristics which vary with application of voltage or electric current. Electrochromic materials which can be used in ECD devices may be either inorganic or organic. Inorganic materials that are considered usable mainly include oxides of transition metals, but these are limited with respect to developable colors. Transition metal oxides also cause electrochemical elution of the membrane or deterioration of electrodes when protons are used as color-forming ions, although response speeds may be high. Organic materials used in electrochromic displays typically include viologen dyes, phthalocyanine complexes, etc. However, the viologen dyes are disadvantageous in that repeated use thereof results in precipitation of insoluble substances, and the phthalocyanine complexes have an as-yet unsolved problem with adhesiveness between a vacuum-evaporated membrane and a base plate.

Other electrochromic materials which have recently been proposed include: polyanilines as disclosed in A. F. Diaz, et al., *Journal of Electro-Analytical Chemistry*, Vol. 111, 111 (1980) or Yonemaya et al., ibid, Vol. 161, 419 (1984); polypyrroles as disclosed in A. F. Diaz et al., ibid, Vol. 101 (1983) and polythiophenes as disclosed in M. A. Druy, et al., *Journal de Physique*, Vol. 44, June, page C3-595 (1983) or Kaneto et al., *Japan Journal of Applied Physics*, Vol. 23, No. 7, page L412 (1983). However, none of these materials has been put to practical use. Preferred characteristics for electrochromic materials are rapid response time in electrochromic switching, high contrast and resolution, good color tones and the like. Furthermore, as noted above, an electrochromic material such as PITN which is capable of developing a colorless tone will greatly contribute to the applicability of the device. This is in contrast to the aforementioned heteroconjugated materials which are colored in the course of conversion from an oxidized state to a reduced state.

SUMMARY OF THE INVENTION

Accordingly, it is a primary object of the present invention to provide an electrochromic display device which includes a conductive polymer membrane capable of being reversibly oxidized or reduced.

It is another object of the invention to provide such a device in which the electrochromic polymer membrane is optically transparent.

It is still another object of the invention to provide such a device in which the electrochromic polymer membrane is a high molecular weight polyisothianaphthene.

It is a further object of the invention to provide an electrochromic display in which the electrochromic membrane material is chemically and physically stable, provides a high contrast color change upon oxidation and reduction, and gives a rapid response time in electrochromic switching.

It is another object of the invention to use polyisothianaphthene as an electrode or electrode coating material, in the production of solar batteries, and, generally, as an electrochromic material in reversible oxidation-reduction systems.

Additional objects, advantages and novel features of the invention will be set forth in part in the description which follows, and in part will become apparent to those skilled in the art on examination of the following, or may be learned by practice of the invention.

In one aspect of the invention, an electrochromic display is provided wherein a high molecular weight conductive membrane is formed on a conductive transparent base, the transparent base used as a display base under which is an opposing electrode arranged via a liguid electrolyte. The conductive, "electrochromic" membrane is a polymer having an isothianaphthene structure which is capable of continuous and reversible oxidation and reduction.

In related aspects of the invention, the superior opto-electrochemical properties of the novel polymers are relied upon in the construction of other applications, i.e. in using polyisothianaphthenes as electrodes or electrode coatings, or in solar energy conversion cells. As will be demonstrated in the Examples, the electrochromic switching properties of the polymers make possible a variety of applications. While the novel polymers and methods of making the polymers are disclosed in U.S. Ser. No. 736,984, previously incorporated by reference herein, a brief summary of the preferred synthetic method will be set forth below.

BRIEF DESCRIPTION OF THE FIGURES

FIG. 15 illustrates electrochromic switching of two samples of polyisothianaphthene films having different surface areas (the curves are each for the 50th cycle).

DETAILED DESCRIPTION OF THE INVENTION

Figure 1:
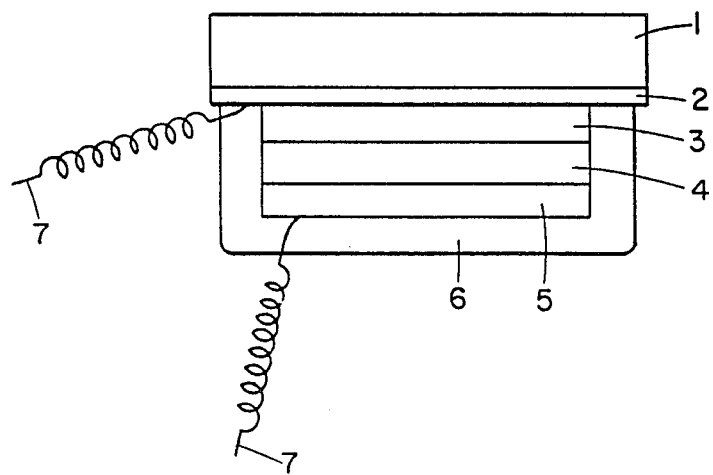
FIG. 1 is a schematic cross-sectional view illustrating an example of the ECD device in accordance with a preferred embodiment of the present invention.

In a preferred embodiment of the invention, an electrochromic display device includes an electrochromic, polymeric membrane comprising polyisothianaphthene. Referring now to FIG. 1, polyisothianaphthene membrane 3 is formed on display electrode 2, e.g. by electropolymerization as will be discussed, which display electrode is in turn adjacent transparent base 1. Liquid electrolyte 4, which includes a support electrolyte dissolved or dispersed in a suitable solvent, separates the PITN membrane from opposing electrode 5. Protecting layer 6 serves as a housing for the device. Voltage is applied across the device, i.e. between display electrode 2 and opposing electrode 5, by means of lead-in wires 7 which are in electrical contact with the two electrodes.

The conductive, electrochromic membrane is comprised of a polyisothianaphthene given by structure Ia or Ib:

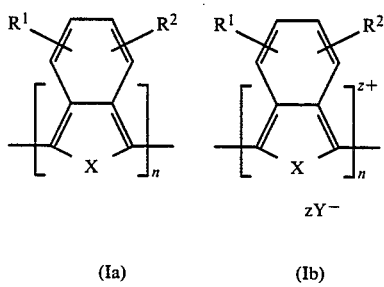

(Ia) (Ib)

wherein: R$^1$ and R$^2$ are selected independently from the group consisting of hydrogen atoms and hydrocarbon residues having 1 to 5 carbon atoms, with the proviso that the R$^1$ and R$^2$ moieties may link together to form, along with the benzene ring, a fused ring which is naphthalene; X is selected from the group consisting of sulfur, selenium and tellurium; Y$^-$ represents an anion of an electrolyte; z represents a number from 0.01 to 1 showing a ratio of the anion per mole of a monomer; and n represents a number of from 5 to 500, i.e. represents the degree of polymerization.

In an exemplary embodiment, X is sulfur, R$^1$ and R$^2$ are independently selected from the group consisting of hydrogen, methyl and ethyl, and may thus both be hydrogen. Alternatively, R$^1$ and R$^2$ may be independently selected from the group consisting of hydrogen, methyl, methoxy and thiomethyl. The anion Y$^-$ is preferably selected from the group consisting of Cl$^-$, Br$^-$, I$^-$, ClO$_4^-$, BF$_4^-$, PF$_6^-$, AsF$_6^-$, SbF$_6^-$, AlCl$_4^-$, AlBr$_4^-$, FeCl$_4^{31}$ and CF$_3$SO$_3^-$, but may also be HSO$_4^-$ or HF$_2^-$. The ratio z is preferably from about 0.01 to 0.40.

Formula Ia represents the polymer in its undoped state; Formula Ib represents the polymer in its doped, conductive state wherein a positive charge is movable along the backbone of the polymer chain. Thus, in the electrochromic display device of the present invention, application of a voltage across the device using lead-in wires 7 converts the neutral, uncharged polymer of Formula Ia to the charged polymer of Formula Ib.

The thickness of the PITN layer in the electrochromic display is from about 0.03 to 30 μm, preferably from about 0.05 to 22 μm, still more preferably from about 0.1 to 10 μm. When the membrane thickness is less than about 0.03 μm, clear contrast cannot be attained, while a thickness exceeding about 30 μm provides clear contrast but is disadvantageous from the point of view of film strength or response speed.

The PITN layer may be provided on display electrode 2 by any number of techniques but is preferably provided by electrochemical polymerization of the structure (II)

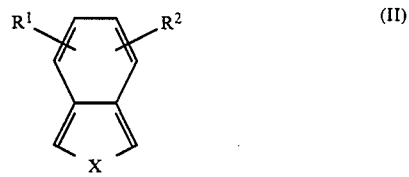

(II)

wherein R$^1$, R$^2$ and X are as given above. Specific examples of the isothianaphthene of Formula II include 1,3-isothianaphthene, 5-methyl-1,3-isothianaphthene, 5,6-dimethylisothianaphthene, 5-ethyl-1,3-isothianaphthene, 5-methyl-6-ethyl-1,3-isothianaphthene, and the like. Procedural details of the preferred electrochemical polymerization process are set forth in related application U.S. Ser. No. 736,934, as are alternative synthetic methods.

Electrochemical polymerization of the above-described isothianaphthene compound can be carried out according to the methods generally employed for electrochemical polymerization of thiophene, pyrrole, etc. (e.g., the method described in Solid State Communication. Vol. 46, No. 5, 389 (1983)). More specifically, either controlled potential electrolysis or controlled current electrolysis can be employed, and it is desirable to form a polymer membrane on a transparent base by using a conductive transparent base as a sample electrode.

The conductive transparent base 1 which can be used in the present invention includes ones which comprise a transparent insulator such as glass, polyester film, etc., having vacuum evaporated thereon indium-tin oxide, tin oxide, platinum, etc. by sputtering or a like method, which materials are readily available commercially.

ECD devices can be produced by assembling the thus obtained polymer with an opposing electrode via a liquid electrolyte. The liquid electrolyte which can be used is a dispersion or solution of a supporting electrolyte in a solvent. The supporting electrolyte which can be used in the present invention includes combinations of (i) anions (i.e., $Y^-$ in the formula (III) such as halide anions of Va group elements e.g., $PF_6^-$, $SbF_6^-$, $AsF_6^-$ and $SbCl_6^-$; halide anions of IIIa Group series element, e.g., $BF_4^-$; halogen anions, e.g., $I^-(I_3^-)$, $Br^-$ and $Cl^-$; perchloric acid anions, e.g., $ClO_4^-$; and (ii) cations such as alkali metal ions, e.g., $Li^+$, $Na^+$ and $K^+$; quaternary ammonium ions, e.g., $R_4N^+$ (wherein R represents a hydrocarbon residue having 1 to 20 carbon atoms); and phosphonium ions, e.g., $(C_6H_5)_4P^+$, but these combinations are merely illustrative and not limiting.

Specific examples of the supporting electrolytes composed of the above-described combinations of anions (X) and cations are $LiPF_6$, $LiSbF_6$, $LiAsF_6$, $LiClO_4$, $NaI$, $NaPF_6$, $NaSbF_6$, $NaAsF_6$, $NaClO_4$, $KI$, $KpF_6$, $KSbF_6$, $KAsF_6$, $KClO_4$, $[(n\text{-}Bu)_4N]^+\cdot ClO_4^-$, $LiAlCl_4$, $LiBF_4$, $(C_6H_5)_4P\cdot BF_4$, $(C_6H_5)_4P\cdot AsF_6$ and $(C_6H_5)_4P\cdot ClO_4$, but these examples, again, are not limiting. These supporting electrolytes may be used individually or in combination.

The $HF_2^-$ and $HSO_4^-$ anions can also be used, in addition to the above-enumerated anions. Further, cations which can be used in addition to those enumerated above include pyrylium or pyridinium ions represented by the following formula (III) and carbonium cations represented by the following formula (IV) or (V):

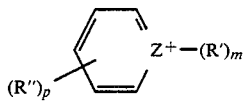 (III)

wherein Z represents an oxygen atom or a nitrogen atom; R' represents a hydrogen atom, an alkyl group having 1 to 15 carbon atoms or an aryl group having 6 to 15 carbon atoms; R" represents a halogen atom, an alkyl group having 1 to 10 carbon atoms or an aryl group having 6 to 15 carbon atoms; m is 0 when Z is an oxygen atom, or m is 1 when Z is a nitrogen atom; and p is 0 or an integer of from 1 to 5; and

 (IV)

wherein $R^3$, $R^4$ and $R^5$ are independently selected from the group consisting of hydrogen atoms, alkyl groups having 1 to 15 carbon atoms, aryl groups having 6 to 15 carbon atoms and $-OR^6$ wherein $R^6$ represents an alkyl group having 1 to 10 carbon atoms or an aryl group having 6 to 15 carbon atoms with proviso that $R^3$, $R^4$ and $R^5$ are not all hydrogen atoms.

The $HF_2^-$ anion which can be used is usually obtained by dissolving a hydrofluoride compound represented by the formula (V), (VI), or (VII):

 (V)
 (VI)

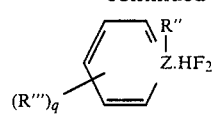 (VII)

wherein R' and R" each represents a hydrogen atom, an alkyl group having 1 to 15 carbon atoms or an aryl group having 6 to 15 carbon atoms; R" represents an alkyl group having 1 to 10 carbon atoms or an aryl group having 6 to 15 carbon atoms; Z represents an oxygen atom or a nitrogen atom; q represents 0 or a positive integer of 5 or less; and M represents an alkali metal, as a supporting electrolyte in an appropriate solvent. Specific examples of the compounds represented by the above formulae (V), (VI), and (VII) include $H_4N\cdot HF_2$, $Bu_4N\cdot HF_2$, $Na\cdot HF_2$, $K\cdot HF_2$, $Li\cdot HF_2$ and

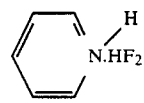

The pyrylium or pyridinium cations can be obtained by dissolving a salt formed between a cation represented by the formula (III) and an anion, e.g., $ClO_4^-$, $BF_4^-$, $AlCl_4^-$, $FeCl_4^-$, $SnCl_5^-$, $PF_6^-$, $PCl_6^-$, $PCl_6^-$, $SbF_6^-$, $AsF_6^-$, $CF_3SO_3^-$, $HF_2^-$, etc., as a supporting electrolyte in an appropriate solvent. Specific examples of such salts include:

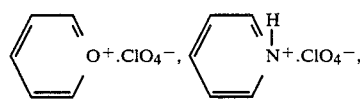

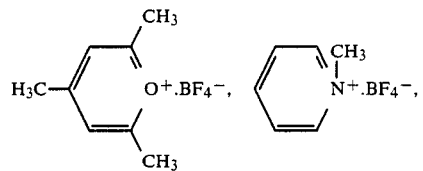

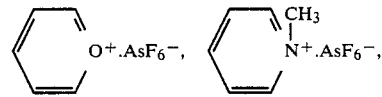

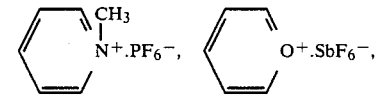

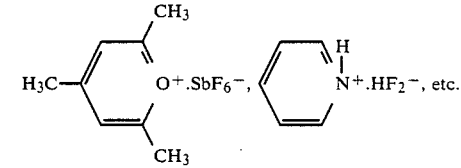

Specific examples of the carbonium cations represented by the above-described formula (IV) or (V) include $(C_6H_5)_3C^+$, $C_7H_7^+$, etc.

These carbonium atoms can be obtained by dissolving or dispersing a carbonium salt formed between such a cation and an anion as a supporting electrolyte in an appropriate solvent. Suitable anions typically include $BF_4^-$, $AlCl_4^-$, $AlBr_3Cl^-$, $FeCl_4^-$, $PF_6^-$, $PCl_6^-$, $SbCl_6^-$, $SbF_6^-$, $ClO_4^-$, $CF_3SO_3^-$, etc., and the carbonium salt specifically includes, for example, $(C_6H_5)_3C.BF_4$, $(CH_3)_3C.BF_4$, $HCO.AlCl_4$, $HCO.BF_4$, $C_6H_5CO.SnCl_5$. etc.

The solvents which can be used in the present invention may be either aqueous or nonaqueous, although a solution of the aforesaid supporting electrolyte in a nonaqueous organic solvent is preferred. The organic solvents used herein are preferably aprotic and have high dielectric constants. For example, ethers, ketones, nitriles, amines, amides, sulfur compounds, phosphoric ester compounds, phosphorous ester compounds, boric ester compounds, chlorinated hydrocarbons, esters, carbonates, nitro compounds and the like can be employed. Of these, ethers, ketones, nitriles, phosphoric ester compounds, phosphorous ester compounds, boric ester compounds, chlorinated hydrocarbons and carbonates are preferred. Specific examples of suitable solvents include tetrahydrofuran, 2-methyltetrahydrofuran, 1,4-dioxane, acetonitrile, proprionitrile, 4-methyl-2-pentanone, butyronitrile, valeronitrile, benzonitrile, 1,2-dichloroethane, $\gamma$-butyrolactone, valerolactone, dimethoxyethane, methylformate, propylene carbonate, ethylene carbonate, dimethylformamide, dimethyl sulfoxide, ethyl phosphate, methyl phosphate, ethyl phosphite, methyl phosphite, 3-methylsulfolane, etc. Among these, nitriles and carbonates are especially preferred in order to increase the response speed.

These organic solvents may be used alone or in combination.

Depending upon the model of ECD devices used or the kind of electrodes used, oxygen or water present in these solvents or protonic solvents sometimes deteriorate the performance of ECD devices. Such being the case, it is preferable to purify the solvents beforehand in the usual manner. Further, in the ECD devices of the present invention, organic solvents having merely dispersed therein a supporting electrolyte, or an organic solid electrolyte having high ionic conductivity which is composed of polyethylene oxide and NaI, NaSCN, etc, can also be used in addition to the above-described electrolytes.

Concentrations of the supporting electrolyte used in the ECD devices of this invention vary depending on the kind of organic solvents used, current and voltage values of applied electricity, operating temperatures, the kind of supporting electrolytes and the like and, therefore cannot generally be fixed. The liquid electrolyte may be either homogeneous or heterogenous, but usual concentrations range from about 0.001 to about 10 mol/l. The distance between the high molecular weight conductive membrane and an opposing electrode cannot generally be determined since it varies, depending on the kind of supporting electrolytes current and voltage values of applied electricity, the display surface area as an ECD device and the like, but it is preferably from about 0.05 to about 5 mm. Further, as an opposing electrode, a variety of materials can be employed according to the end use. For example, when transmitted light is utilized for displaying, the conductive transparent materials are preferably used as opposing electrodes. If reflected light is utilized, however, it is also possible to use opaque conductive materials as opposing electrodes. Examples of opaque materials include, but are not limited to, metal foil (e.g., nickel or platinum) and gauze.

Furthermore, since the ECD devices provide a substantially colorless tone, background plates having various color tones can be selected. Thus, the ECD devices of the present invention can be used in a wide variety of applications owing to the wide selection of available materials which can be used.

Other uses of the polyisothianaphthene family include general use as electrically conductive or electrochromic materials, i.e., in applications where a highly conductive polymer—displaying extremely rapid electrochemical doping characteristics—is desired, or where reversible oxidation and reduction occurs, with or without simultaneous optical switching.

In one alternative embodiment of the invention, then, the polyisothianaphthenes of the present invention are used as electrodes or as electrode coatings in a battery. For example, a battery may be provided wherein polyisothianaphthene is the cathode and lithium, calcium or other suitable material is used as an anode. The electrodes are separated with a porous partitioning membrane selected such that ions can freely pass through its structure. The electrode/membrane assembly is then placed within a suitable electrolyte solution, and a voltage is applied across the electrodes. As demonstrated in Example XIII, such a battery may be used repeatedly without substantial reduction in the charge-discharge efficiency of the device. Furthermore, self-discharging in such a polyisothianaphthene battery is minimized.

Polyisothianaphthene is also useful in a solar energy conversion cell, as a surface membrane material which is rendered conductive upon absorption of light. Polyisothianaphthene is particularly effective in a solar battery, as its light absorption characteristic is relatively close to that of sunlight. The polymer also represents an improvement over the analogous use of polyacetylenes, as those compounds, as noted above, are particularly susceptible to oxidation and are extremely sensitive to humidity.

It is to be understood that while the invention has been described in conjunction with specific embodiments thereof, that the foregoing description as well as the examples which follow are intended to illustrate and not limit the scope of the invention, which is defined by the scope of the appended claims. Other aspects, advantages and modifications within the scope of the invention will be apparent to those skilled in the art to which the invention pertains.

EXAMPLE I

Preparation of polyisothianaphthene from 1,3-Dihydroisothianaphthene-2-Oxide (a) 1,3-Dihydroisothianaphthene-2-Oxide IIa; $R^1=R^2=H$ To 200 ml of a solution containing 1 mol/l of lithium triethyl borohydride Were added 3.21 g (0.1 mol) of powderous sulfur placed in a Schlenk flask at room temperature under a nitrogen atmosphere. The reaction took place immediately and the sulfur powder was dissolved to form a yellow suspension. This suspension became a pale yellow clear solution upon contact with a trace amount of air.

Separately, into a 2 liter-volume four-necked flask equipped with a dropping funnel, a stirrer, a thermometer and an inlet for introducing nitrogen were charged 26.4 g (0.1 mol) of 0-xylylene dibromide and 1 liter of anhydrous tetrahydrofuran under a nitrogen atmosphere to form a solution. While stirring, the above prepared tetrahydrofuran solution of lithium sulfide was added thereto dropwise at room temperature over a period of 1.5 hours. Thereafter, the tetrahydrofuran was removed by distillation under reduced pressure, and the residue was further distilled to obtain 10.9 g (yield: 80%) of colorless 1,3-dihydroisothianaphthene having a boiling point of 74°–76° C./3 mm Hg. The IR spectrum of the product showed absorptions based on the phenyl group at 3060, 3026, 1582 and 1485 cm$^{-1}$; absorption based on the methylene group at 2910, 2840 and 1450 cm$^{-1}$; absorption based on in-plane deformation of 1,2-substituted phenyl at 1195 cm$^{-1}$; absorption of o-substituted phenyl at 760 cm$^{-1}$; and absorption of sulfide at 740 cm$^{-}$. The results of NMR spectrum ($^1$H-NMR) measurement in CDCl$_3$ with TMS as an internal standard are as follows: 4.22 (s, 4H); 7.20 (s, 4H).

This compound was very labile and changed from yellow to black even when preserved under light-screening and sealing.

Then, the thus obtained 1,3-dihydroisothianaphthene was added to 450 ml of a previously prepared 50% methanol aqueous solution having dissolved therein 18.6 g (0.086 mmol) of sodium metaperiodate, and the mixture was stirred at room temperature for 12 hours. The formed precipitate was separated by filtration. The filter cake was washed with 50 ml of methanol, and the washing and the filtrate were combined and concentrated under reduced pressure. The resulting yellowish white solid was recrystallized from ethyl acetate-cyclohexane to obtain slightly yellow-tinged crystals having a melting point of 87°–89° C.

The resulting crystals were further recrystallized from ethyl acetate-cyclohexane to obtain crystals having a melting point of 90° to 91° C. The IR spectrum of the crystals showed strong absorption of sulfoxide at 1035 cm$^{-1}$ in addition to the absorptions of isothianaphthene; the absorption of sulfide at 740 cm$^{-1}$ had disappeared. The $^1$H NMR spectrum measured in CDCl$_3$ with TMS as an internal standard were as follows: 4.65 (s, 4H); 7.20 (s, 4H). Elementary Analysis for C$_8$H$_8$SO: Calc'd. (%): C, 63.16; H, 5.26; S, 21.05. Found (%); C, 63.08; H, 5.15; S, 20.87

(b) Synthesis of Polyisothianaphthene

Figure 2:
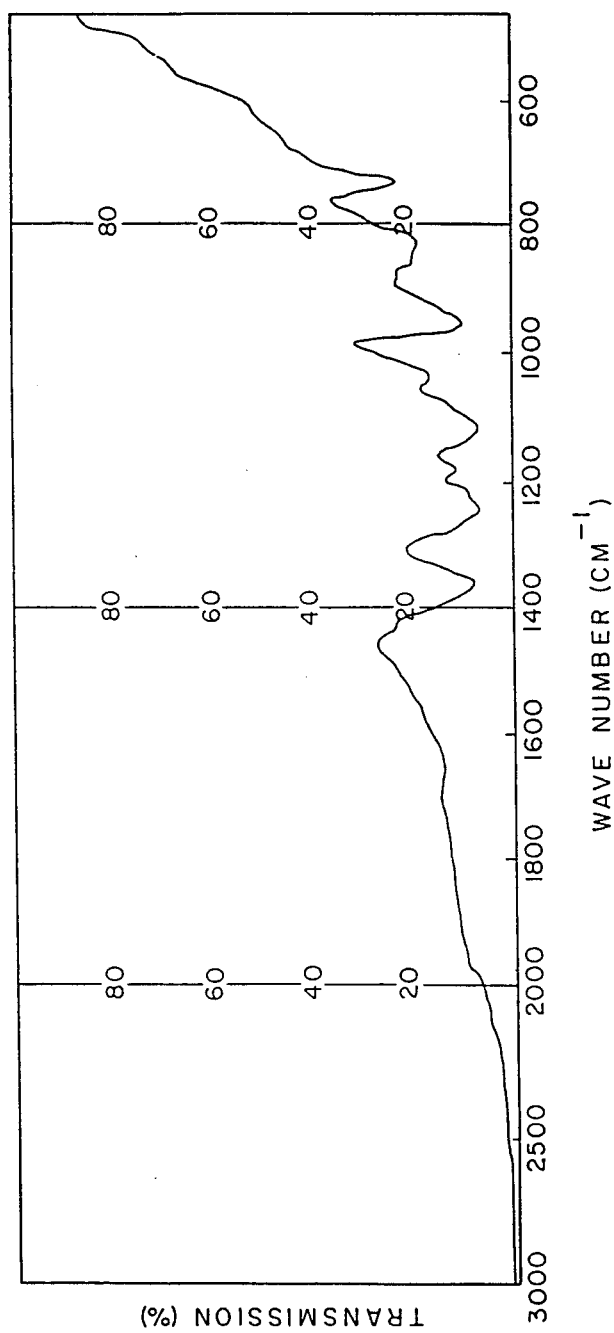
FIG. 2 is an infrared absorption spectrum of the polymer prepared in Example I.

Five hundred milligrams (3.29 mmol) of 1,3-dihydroisothianaphthene-2-oxide were added to 1 ml of concentrated sulfuric acid and the reaction system immediately turned dark red. The mixture was allowed to stand at room temperature for 70 hours, and the substantially solidified system was added to 400 ml of methanol. The formed brown precipitate was separated by centrifugation, thoroughly washed with water and vacuum dried at 60° C. overnight. The resulting polymer was placed in a Soxhlet extractor and extracted successively with methylene chloride and chlorobenzene for 12 hours, respectively, to obtain 203 mg of an insoluble chlorobenzene compound. The IR spectrum of the resulting polymer is as shown in FIG. 2. The results of the elementary analysis were; C, 67.26%; H, 3.12%; and S, 23.59% in good agreement with calculated values (C, 67.19%; H, 3.32%; S, 23.54%) on the assumption that the repeating unit had the following structure:

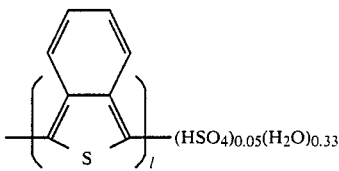

The conductivity ($\sigma_{RT}$) of the polymer at room temperature was measured by the use of a 4-terminal network conductivity measuring cell and was found to be $2 \times 10^{-2}$ S/cm.

EXAMPLE II

Figure 3:
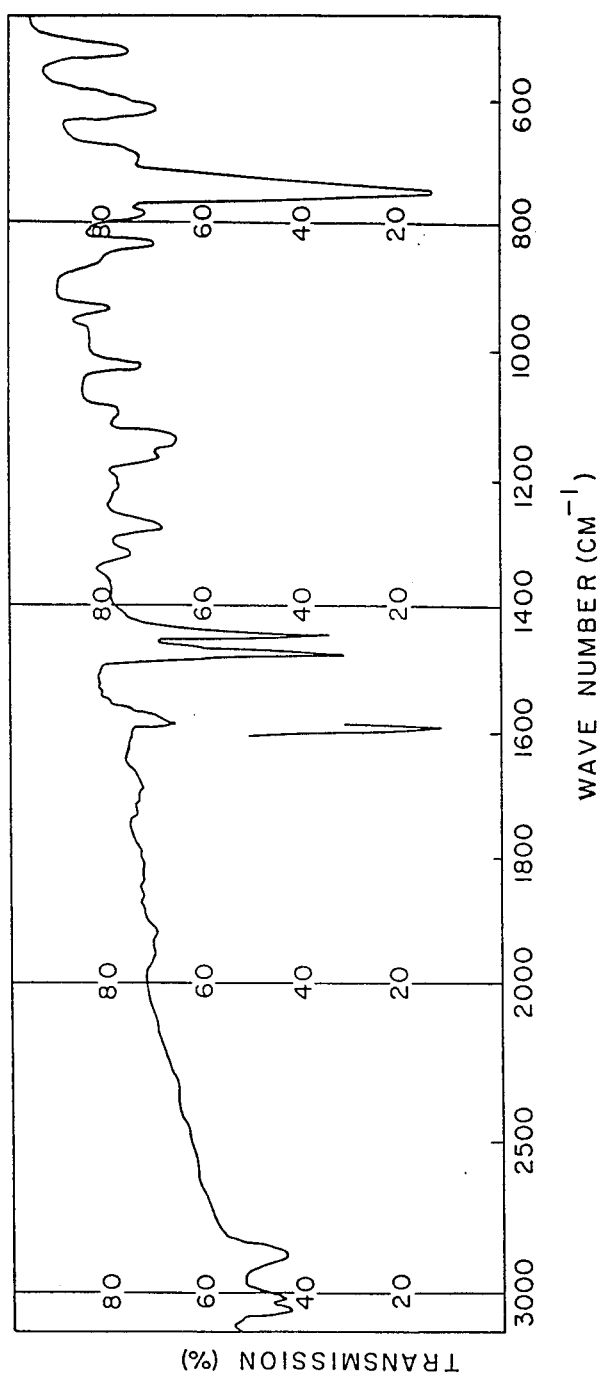
FIG. 3 is an infrared absorption spectrum of the polymer prepared in Example II.
Figure 4:
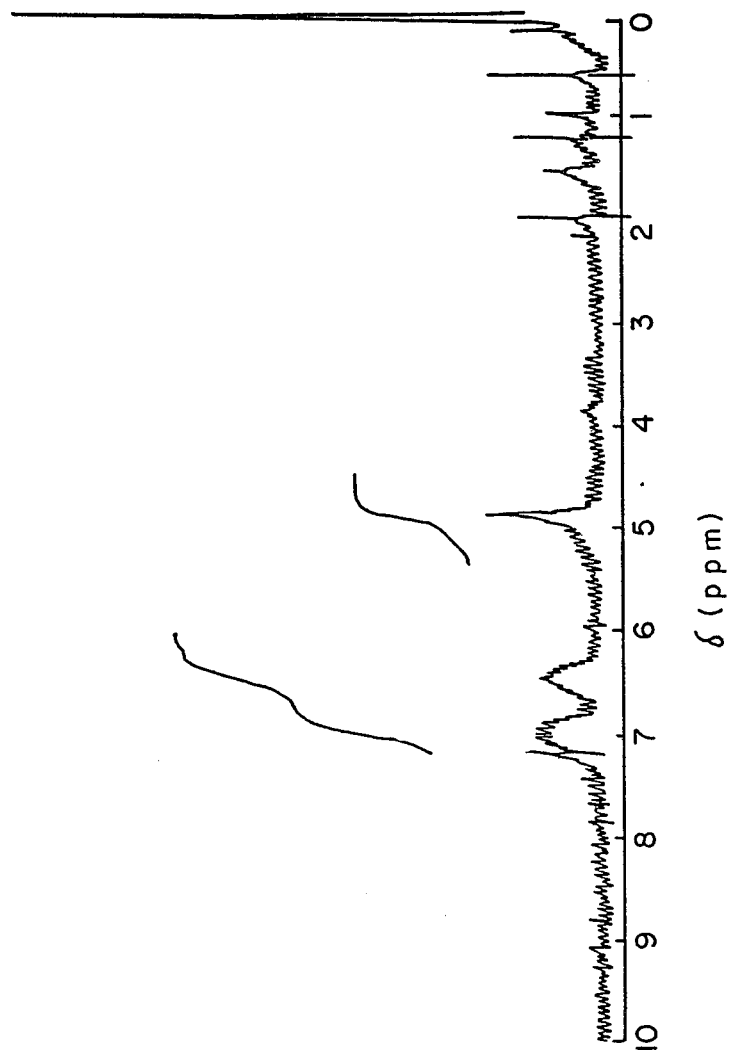
FIG. 4 is an NMR spectrum of the polymer prepared in Example II.

Preparation of Polyisothianaphthene by Oxidation of Polydihydroisothianaphthene Obtained by Cationic Polymerization of Isothianaphthene with Oxidizing Agent (a) Systhesis of Isothianaphthene II, R$^1$=R$^2$=H Three hundred milligrams (1.97 mmol) of 3-dihydroisothianaphthene-2-oxide synthesized according to Example 1(a) and 450 mg (4.41 mmol) of neutral alumina were thoroughly pulverized and mixed in a mortar, then put in a sublimation apparatus and heated on an oil bath under reduced pressure. There was obtained 250 mg (1.87 mmol) of isothianaphthene as white needle crystals at the bottom of a cooling part of the sublimation apparatus. Immediately thereafter, the resulting monomer was dissolved in 5 ml of purified and degassed methylene chloride, and 10 mg of trifluoroacetic acid were added. The mixture was then allowed to stand overnight. When the reaction mixture was poured into 50 ml of methanol, a white precipitate was obtained. The resulting polymer was soluble in chloroform, chlorobenzene, tetrahydrofuran and N,N-dimethylformamide. The IR and $^1$H-NMR spectra of the polymer were as shown in FIGS. 3 and 4 respectively.

Further, it was confirmed that the polymer had a molecular weight of 2000 D as compared to polystyrene by gel-permeation chromatography (Varian 5000) of a tetrahydrofuran solution of the polymer.

The electrical conductivity ($\sigma_{RT}$) of the polymer at room temperature was measured in the same manner as in Example 1 was $10^{-8}$ S/cm or less. Elemental Analysis for (C$_8$H$_6$S): Calc'd. (%): C, 71.64; H, 4.48; S, 23.88 Found (%): C, 71.27; H, 4.54; S. 23.96

The same procedures as described above were repeated except that methanesulfonic acid was used as a polymerization initiator in place of trifluoroacetic acid. The IR spectrum of the resulting polymer was in complete agreement with that of FIG. 3.

Figure 5:
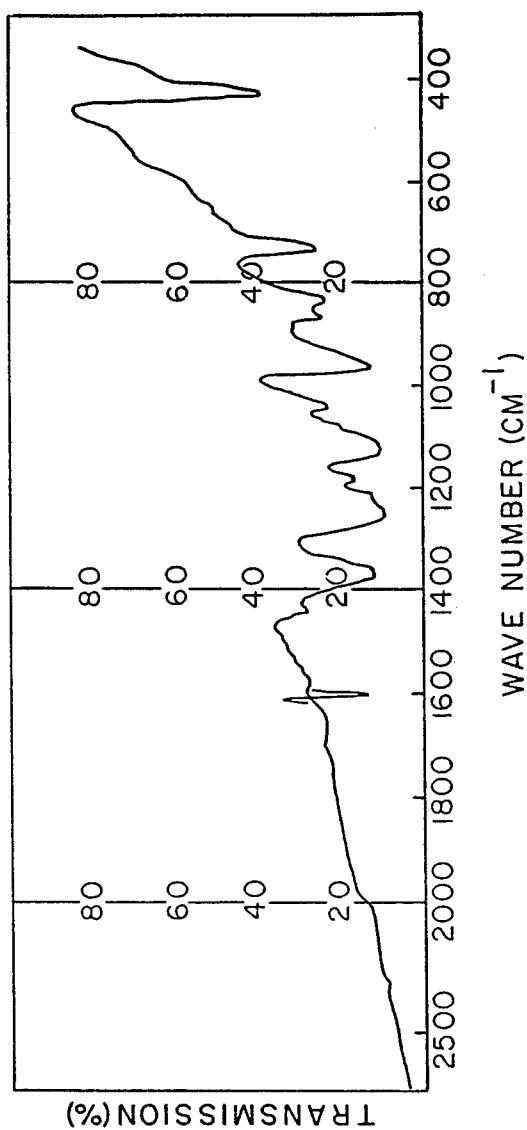
FIG. 5 is an infrared absorption spectrum of the polymer obtained by treating the polymer first prepared in Example II with tetrachloro-p-benzoquinone (chloronyl).

These polymers were dissolved in 5 ml of chlorobenzene and treated with two equivalents of chloronyl to form a black precipitate. The resulting polymer had a conductivity ($\sigma_{RT}$) of $9 \times 10^{-2}$ S/cm at room temperature. and the electrical conductivity of an iodine-doped polymer was $9 \times 10^{-1}$ S/cm. The IR spectrum of the polymer is shown in FIG. 5. After iodine-doping, the polymer did not undergo any change in conductivity, even when left to stand in air at room temperature for 1 week.

In the same manner as described above. except for using 5 ml of chloroform in place of chlorobenzene and one-half the molar amount of N-chlorosuccinimide in place of chloronyl, a black polymer having entirely the same IR Spectrum as that shown in FIG. 5 was obtained. The conductivity ($\sigma_{RT}$) of this polymer was found to be $2.6 \times 10^{-1}$ S/cm.

EXAMPLE III

Preparation of Polyisothianaphthene by One-Step Oxidative Polymerization of Isothianaphthene Isothianaphthene was synthesized in the same manner as described in Example 2(a). A mixture of 250 mg of isothianaphthene, 5 ml of anhydrous methylene chloride, 134 mg of anhydrous aluminum chloride and 134 mg of anhydrous cupric chloride were allowed to react at a temperature of 35° to 37° C. for 1 hour to form a black precipitate. After the reaction mixture as such was maintained at that temperature for 12 hours, the precipitate was treated with a methanol solution having been rendered acidic with hydrochloric acid, thoroughly washed with water and dried. The dried polymer was extracted successively with hot methanol, hot methylene chloride and hot chlorobenzene to obtain 205 mg of a black polymer. The IR spectrum of this product was in complete agreement with FIG. 5. The electric conductivity ($\sigma_{RT}$) was $2.8 \times 10^{-2}$ s/cm.

EXAMPLE IV

Preparation of Polyisothianaphthene by Electrochemical Polymerization of Isothianaphthene Electrochemical polymerization of isothianaphthene was carried out by using an electrolytic solution prepared by dissolving an electrolyte indicated in Table 1 below and isothianaphthene in a polar solvent at a prescribed concentration; a platinum plate as a sample electrode; an aluminum plate as a counter electrode; at room temperature at a constant voltage for a prescribed period of time. There was formed a polyisothianaphthene film on the platinum plate anode. The aforesaid electrolytic solution had been subjected in advance to disoxidation by bubbling dry argon gas therethrough for at least 30 minutes. The constant voltage during the polymerization, was 1.5V.

The thus formed film was thoroughly washed successively with acetonitrile and methylene chloride and dried in vacuo. The electrical properties of the film were determined, and the results obtained are shown in Table 1 below. (Note: in Table 1, "$\phi$" represents a phenyl substituent.)

EXAMPLE V

Poly(dihydroisothianaphthene by Electrochemical Polymerization

The monomer isothianaphthene was prepared by the procedure described in the literature (J. A. Gadysz et al., Tetrahedron, 1979, Vol. 35, 2239; M. P. Cava et al., J. Amer. Chem. Soc., 1959, Vol. 81, 4266; M. P. Cava et al., J. Org. Chem., 1971, Vol. 36, 3932), and used directly after preparation. The polymer poly(dihydroisothianaphthene) was obtained by electrochemical oxidation of this monomer in a two-electrode, separate compartment cell. A platinum sheet was used as the anode, and oxidized graphite was used as the cathode. The clear colorless solution used for the polymerization contained 0.23M of isothianaphthene with 0.30M electrolyte, $Bu_4NPF_6$, in acetonitrile. The acetonitrile (Mallinckrodt) was used directly without further purification. A series of 1.5V batteries was used as the power supply.

All experiments were carried out under dry $N_2$. When 4.5V was applied across this cell, white powder immediately appeared near the anode. The batteries were disconnected after ten minutes. This white powder, poly(dihydroisothianaphthene), was separated by suction filtration, washed with acetonitrile and diethylether, and dried under vacuum. The resulting solid was purified for elemental analysis by reprecipitation from tetrahydrofuran-$H_2O$.

When a freshly prepared sample of isothianaphthene was electrolyzed in the anode compartment of an H cell using $Bu_4NClO_4$ or $Bu_4NBF_4$ as supporting electrolyte and tin oxide-coated glass (TOG) as anode, a copious amount of a white precipitate ("WP") filled the anode compartment. Upon careful observation, it was discovered that the anode was first (instantaneouslyl covered with a very thin blue film and immediately thereafter formation of WP commenced. Appearance of WP was independent of electrode material, solvent, or temperature. Isolation, characterization (IR, El. Anal.) and chemical manipulation (see below) proved WP to be poly(dihydroisothianaphthene). It should be noted that thiophene produces partially oxidized ("doped") polymer films under the above conditions while isothianaphthene, after deposition of the an extremely thin blue film (presumably doped polyisothianaphthene), is trans-

TABLE 1

Electrochemical Polymerization of Isothianaphthene

| Example No. | Concentration of Isothianaphthene (mmol/l) | Electrolyte (Concentration) (mmol/l) | Solvent (Amount) (ml) | Current Application Time (hr) | Color | Property of Polymer | |
|---|---|---|---|---|---|---|---|
| | | | | | | $\sigma RT$ (S/cm) | $\sigma RT$ After Iodine Doping (S/cm) |
| 4-1 | 78.8 | $\phi_4AsCl$ (168) | $CH_3CN$ (25) | 2 | blackish blue | $4.5 \times 10^{-2}$ | $6.8 \times 10^{-1}$ |
| 4-2 | 78.8 | $\phi PCl$ (80) | $CH_3CN$ (25) | 2 | blackish blue | — | — |
| 4-3 | 78.8 | $\phi AsCl$ (168) | $\phi CN$ (25) | 2 | blackish blue | — | — |
| 4-4 | 78.8 | $Bu_4NBr$ (168) | $\phi CN$ (25) | 2 | blackish blue | $4 \times 10^{-1}$ | — |
| 4-5 | 180 | LiBr (300) | $CH_3CN$ (25) | 1 | blackish blue | — | — |
| 4-6 | 180 | $Bu_4NBr$ (300) | $CH_3CN$ (25) | 1 | blackish blue | $4 \times 10^{-1}$ | — |
| 4-7 | 180 | $Bu_4NPF_6$ (300) | $CH_3CN$ (25) | 1 | slightly purplish blue | — | — |
| 4-8 | 180 | $Bu_4NClO_4$ (300) | $CH_3CN$ (25) | 1 | slightly purplish blue | — | — | formed to poly(dihydroisothianaphthene). The only reasonable explanation for this surprising observation is that polyisothianaphthene acts as an initiator of cationic polymerization of isothianaphthene. In order to test this hypothesis, we exposed freshly prepared solutions of isothianaphthene to the usual catalysts for cationic initiation (Bronsted and Lewis acids) and found that all polymerized isothianaphthene to different degrees. But by far the most interesting result was with sulfuric acid in methylene chloride. Under these conditions, isothianaphthene was converted to a blue-black powder form of polyisothianaphthene doped with hydrated sulfuric acid. Clearly the acid acted not only as catalyst but also as oxidizing agent. A reassuring "convergent" test for the above hypothesis was that the product of chloronyl dehydrogenation of poly(dihydroisothianaphthene) and the product of $H_2SO_4$ polymerization exhibited identical infrared spectra. The only reasonable explanation for this observation is that the infrared spectra of doped polyisothianaphthene are dominated by the absorptions due to intramolecular vibrations are weak features of the spectrum. In the absence of additional control experiments, it is difficult to speculate about a specific mechanism to explain this electrolyte effect.

We reasoned that $H_2SO_4$ may convert dihydroisothianaphthene-S-oxide directly into polyisothianaphthene. $(H_2SO_4)_x.(H_2O)_y$. The addition of solid dihydroisothianaphthene-S-oxide to 98% $H_2SO_4$ did in fact produce the desired partially doped polyisothianaphthene (cf. Scheme I, below).

Scheme I

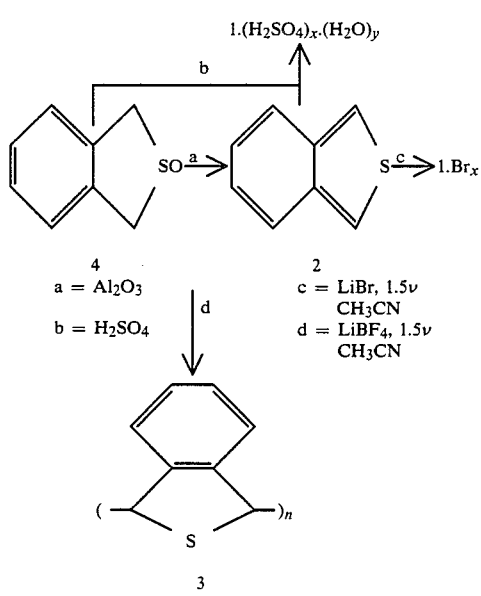

4
a = $Al_2O_3$
b = $H_2SO_4$ 2
c = LiBr, 1.5$\nu$
    $CH_3CN$
d = $LiBF_4$, 1.5$\nu$
    $CH_3CN$

In addition, 7,7,8,8-tetracyanoquinodimethane (TCNQ) can be used as a catalyst for cationic polymerization. However, the product did not exhibit higher conductivity than any of the other doped polyisothianaphthene compounds, indicating that the acceptor is probably not involved in the conductivity of the solid. Two reasons could be advanced for that observation: the acceptor molecules are probably not stacked in small crystalline regions, and/or there is complete charge transfer.

While the above results explain the nature of the process of formation of poly(dihydroisothianaphthene) and allow the discovery of a clean procedure for the chemical synthesis of polyisothianaphthene, it still does not offer an entry to the electrochemical polymerization of isothianaphthene. This required the discovery of a method to prevent the catalysis for poly(dihydroisothianaphthene) formation by "nascent" doped polyisothianaphthene. We found that if the reaction medium contains a species which was more nucleophilic than isothianaphthene, the propagation step would be interrupted. A test experiment which involved addition of iodide to the anode compartment prior to electrolysis failed because iodide was simply oxidized under the electrolysis conditions. However, electrolysis with LiBr, $Bu_4NBr$, and $\phi_4AsCl$ produced excellent films on platinum or TOG. The only reasonable explanation for this observation is that the infrared spectra of doped polyisothianaphthene are dominated by the absorptions due to the conduction electrons and the absorptions due to intramolecular vibrations are weak features of the spectrum. In the absence of additional control experiments, it is difficult to speculate about a specific mechanism to explain this electrolyte effect. Anal. Calc'd for $(C_8H_6S)$: C, 71.60; H, 4.51; S, 23.89 Found: C, 71.27; H, 4.54; S, 23.96. $LiBF_4$ and $Bu_4NClO_4$ can be used as the electrolyte for this reaction.

According to this invention, it has been found that the metastable isothianaphthene can be polymerized to well characterizable highly conducting polymers by at least three different procedures; one of these involves the electrochemical preparation of poly(dihydroisothianaphthene) by the polymerization if isothianaphthene in the presence of nucleophilic anions. It has also been found that poly(isothianaphthene) is a better conductor than polythiophene.

EXAMPLE VI

Poly(dihydroisothianaphthene) by Chemical Cationic Polymerization

The monomer isothianaphthene (396 mg, 2.96 mmol) was dissolved in 10 ml methylene chloride which was previously dried over $P_2O_5$. When one drop of methanesulfonic acid was added to this solution, there was an instantaneous change in the reaction mixture from colorless to red. This color became violet after 90 minutes. After removal of methylene chloride by evaporation, the residue was dissolved in tetrahydrofuran. When this solution was poured into methanol, the polymer poly(dihydroisothianaphthene) precipitated from the solution. This was separated by centrifugation, and dried under vacuum. The infrared spectrum was identical with that of polymer poly(dihydroisothianaphthene) mentioned above.

EXAMPLE VII

Doped Poly(isothianaphthene) by Electrochemical Polymerization

The polymerization procedure was essentially the same as that described above in Example V for the polymer poly(dihydroisothianaphthene). The most important point was the electrolyte. When lithium bromide was used as the electrolyte, a blue film of the doped polymer polyisothianaphthene was grown on the anode (conducting glass) instantly after connecting a 1.5V battery. $Bu_4NBr$ and $Ph_4AsCl$ can also be used as the electrolyte for this reaction.

EXAMPLE VIII

Doped Poly(isothianaphlhene) by Chemical Cationic Oxidative Polymerization with Sulfuric Acid Sulfuric acid (5 ml) was added to the monomer isothianaphthene (396 mg 2.96 mmol). The monomer color changed from white to reddish-black instantly. When the reaction mixture was poured into 400 ml of methanol after overnight stirring, a brown powder, the doped polymer polyisothianphthene precipitated from this solution. This was separated by centrifugation and extracted with methylene chloride and chlorobenzene using a Soxhlet extraction apparatus, followed by drying under vacuum. This reaction can be also carried out with a suspension of sulfuric acid in methylene chloride.

EXAMPLE IX

Doped Poly(isothianaphthene) by Chemical Cationic Oxidative polymerization with TCNQ The monomer isothianaphthene (238 mg 1.77 mmol) was dissolved in 5 ml methylene chloride. after a few Mg of TCNQ were added to this solution, its color changed to red very slowly. After overnight stirring, this color became bluish-black. Next, more TCNQ, which was double the molar quantity of the monomer isothianaphthene, was added to this solution. This was heated to 110° C., and the temperature was maintained at 110° C. for 1 hour. When this reaction mixture was poured into methanol, greenish-black powder precipitated from this solution. This was washed with methanol and chlorobenzene using a Soxhlet extraction apparatus, followed by drying under vacuum.

EXAMPLE X

Polyisothianaphthene from Poly(dihydroisothianaphthene)

The polymer poly(dihydroisothianaphthene), which was prepared by electrochemical polymerization, was dissolved in hot chlorobenzene. This was a light-brown solution. Chloronyl was added to this solution. Immediately the solution color changed to dark green. A powder precipitated from this solution by cooling. This was separated by suction filtration, washed with methanol, and dried under vacuum. All materials which were mentioned in Examples VI and IX showed identical infrared spectra.

Preliminary results of conductivity measurements are compiled in Table II. The band edge of polyisothianaphthene was estimated (from transmission through thin films at low doping levels) to be ~1 eV (1.1µ). This is nearly 1 eV lower than that of polythiophene (~2 eV, 620 nm).

TABLE II

Compaction Conductivity of Doped Polyisothianaphthene

| Compound | [S/cm] |
| --- | --- |
| Polyisothianaphthene.Cl$_x$ | $4.0 \times 10^{-1}$ |
| Polyisothianaphthene.(HSO$_4$)$_{0.05}$.(H$_2$O)$_{0.033}$ | $2.0 \times 10^{-2}$ |
| Polyisothianaphthene.(AlCl$_4$)$_x$ | $2.8 \times 10^{-2}$ |
| Polyisothianaphthene.(TCNQ)$_x$ | $1.5 \times 10^{-2}$ |
| Polyisothianaphthene.(Chloronyl)$_{4x}$ | $1.3 \times 10^{-2}$ |

Figure 6:
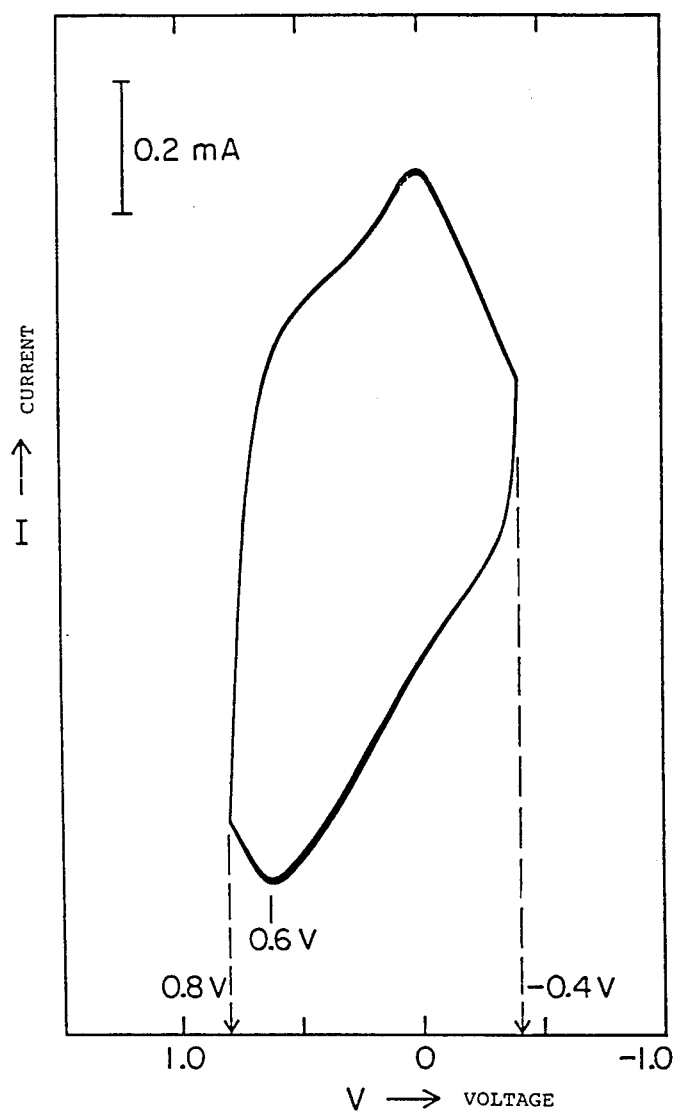
FIG. 6 shows the reversible electrochemical doping of polyisothianaphthene. Thus, using aluminum as one electrode (with a standard calomel reference electrode), the polyisothianaphthene as the other electrode, and a propylene carbonate solution of lithium fluoroborate as the electrolyte, it can be seen that the polymers of this invention are useful as battery electrodes. The experiment of FIG. 6 also demonstrates the electrochromic characteristics of the novel polymers of this invention.

FIG. 6 shows the reversible electrochemical doping of poly(isothianaphthene)isothianaphthene). Thus, using aluminum as one electrode (with a standard calomel reference electrode), the poly(isothianaphthene) as the other electrode, and a propylene carbonate solution of lithium fluoroborate as the electrolyte, it can be seen that the polymers of this invention are useful as battery electrodes.

The experiment of FIG. 6 also demonstrates the electrochromic characteristics of the novel polymers of this invention.

Figure 7:
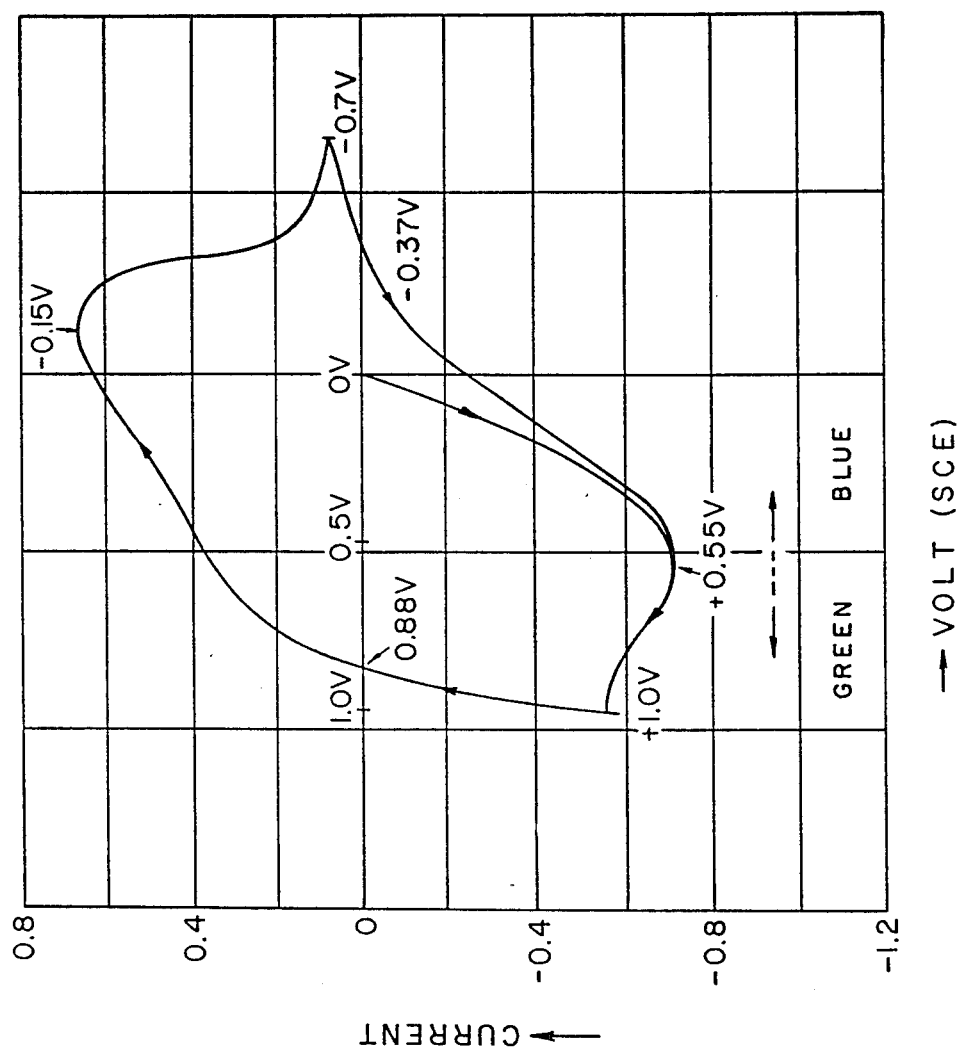
FIG. 7 is a cyclic voltammogram of the high molecular weight conductive membrane according to Example XIV as measured with $(C_4H_9)_4NClO_4$ in acetonitrile as an electrolyte at a voltage of from =1.0V to —0.7V (vs. a standard calomel electrode).

In FIG. 7, we show the electrochromic effect; the dopant was ClO$_4^-$. The reference electrode was lithium. The energy (eV) refers to the incident radiation, with the 0-to-1 range being in the infrared, 1-to-2 in the visible, and 2 and above gradually shifting to the ultraviolet portion of the spectrum. The results shown in FIG. 7 further indicate the utility of the polymers of this invention in solar energy conversion devices because the semiconductor energy gap is well matched to the solar spectrum.

EXAMPLE XI

Use of Polyisothianaphthene as an Electrochemical Display Element

The same procedures as in Example 4-2 were repeated, but using a conductive glass on which indium-tin oxide had been vacuum-evaporated as an anode in place of platinum plate. The isothianaphthene polymer was electrochemically precipitated on the conductive glass as in Example 4-2. The cyclic voltammetry was performed using the above-obtained polymer-coated conductive glass as a working electrode, a platinum wire as a counterelectrode and a standard calomel electrode as a reference electrode; by the use of a polarographic analyzer (174A model manufactured by EG & G Co.) in an acetonitrile solution containing 292 mmol/l of tetrabutylammonium perchlorate at room temperature. The applied voltage sweep rate was 20 mV/sec, and the range of sweep was from +1.0V to −0.7V (vs. standard calomel electrode). The results obtained are shown in FIG. 8.

Figure 8:
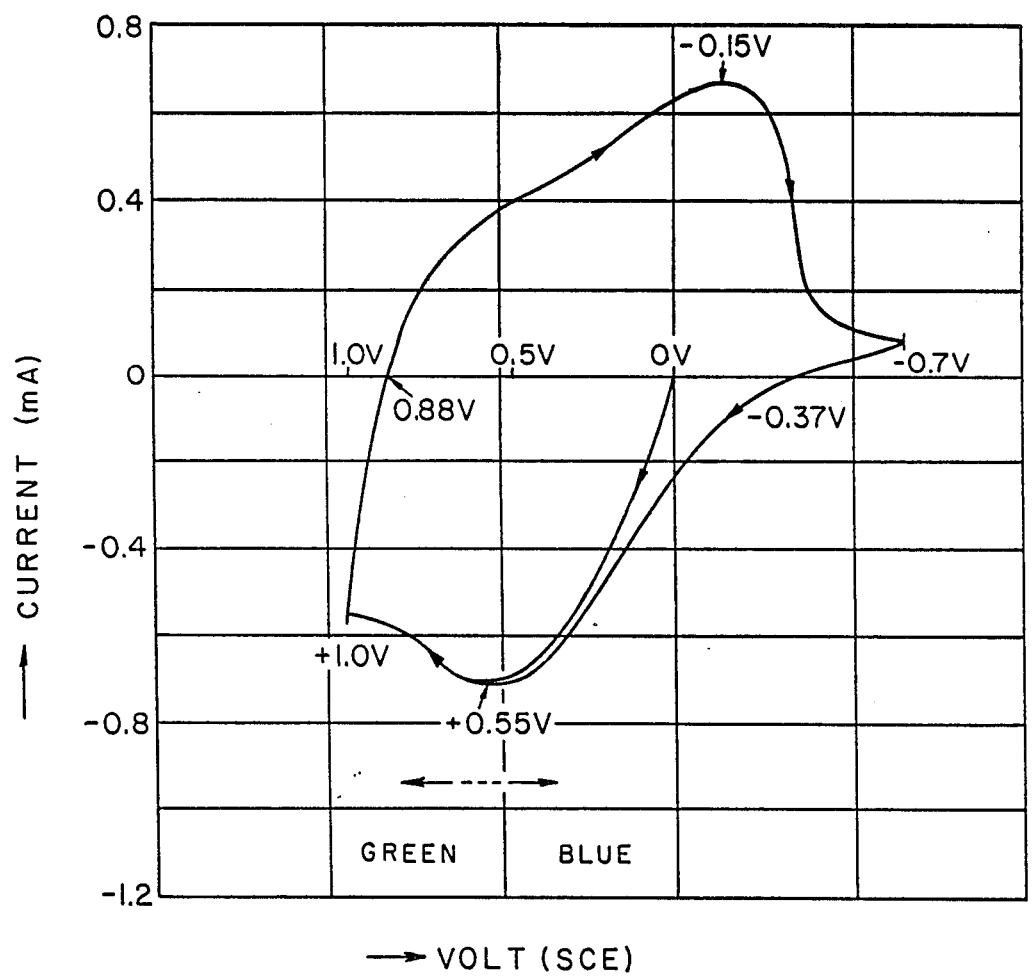
FIG. 8 is a chart illustrating the results of polarographic analysis of the polymer obtained in Test of Use as Electrochromic Material in Example V.

As is shown in FIG. 8, the polymer showed an oxidation peak and a reduction peak at +0.58V and −0.15V, respectively, and had a color varying from deep blue at a voltage range of from −0.7V to +0.6V to extremely transparent light green at a voltage range of from +0.6V to +1.0V. These results indicate that the deep blue state is a neutral state of the polymer and that the polymer has a green color of high transparency in the oxidized and doped state.

EXAMPLE XII

Further Electrochromic Switching Studies

PITN was prepared using the electrochemical polymerization technigue described in Example V. The polymerization was carried out from a solution of 0.07M of isothianaphthene monomer and 0.10M of tetraphenylphosphonium chloride (electrolyte) in acetonitrile; a 3V battery Was used as the power supply and an oxidized graphite rod as the counter electrode. For the electrochromic switching time measurements, PITN was prepared on a glass microslide precoated (by evaporation) with gold, which served to minimize the interface resistance to the PITN electrode. For the transmission electron microscopy measurements, the PITN was polymerized directly onto platinum mesh. When the polymer thickness was increased, powder was observed to drop from the film surface; this powder was used for the x-ray diffraction measurements. Based on elemental analyses, all samples were doped (during polymerization) to 5 mol % Cl⁻ per monomer unit.

The electrochromic switching measurements were carried out with a two-electrode cell. Ni mesh was used as the counter electrode and was separated from the PITN sample by a kiln-dried piece of glass filter paper. The electrolyte was a 2.9M solution of $LiBF_4$ in propylene carbonate. To minimize the cell resistance, the two electrodes and separator were wrapped tightly with teflon tape to yield a net electrode spacing of about 0.2 mm. The upper edge of the gold substrate on the PITN electrode was wrapped with aluminum foil so that an alligator clip could make a good stable contact. The electrochemical cell was assembled inside a controlled atmosphere (argon) dry box. The electrode configuration was inserted into a rectangular glass cell body, the electrolyte was added, and the cell was sealed under argon. The working electrode was connected to the positive terminal of a function generator through a series resistance; the counter electrode was connected to the negative terminal. A schematic diagram of the cell and circuit is shown in Figure X. In order to avoid any spurious effects, the time constant of the lock-in amplified was reduced to values below $10^{-2}$ seconds.

Figure 9:
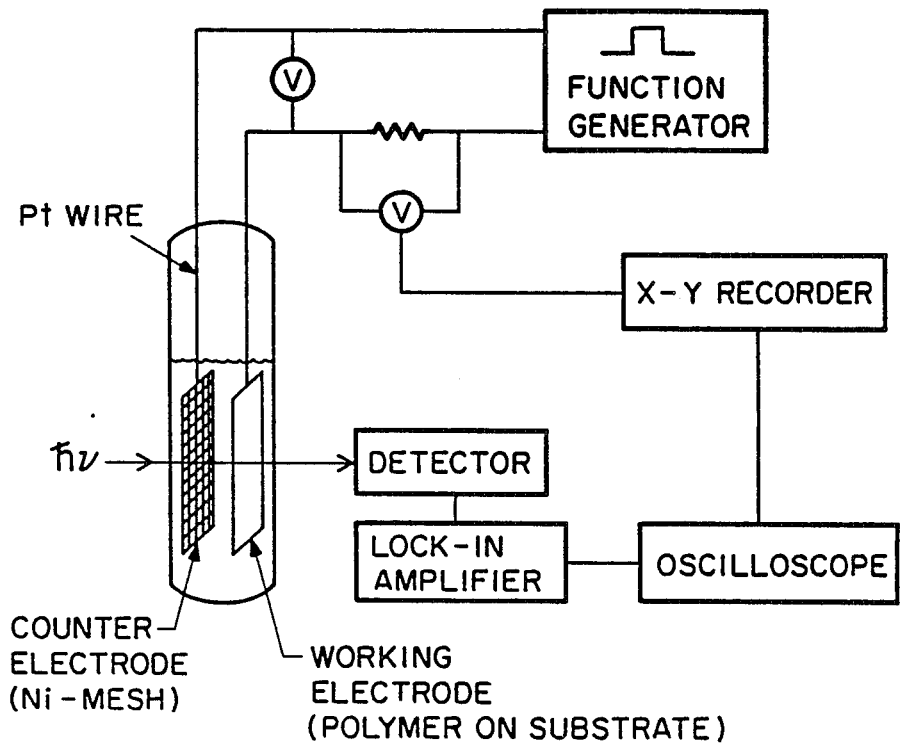
FIG. 9 illustrates an apparatus which is used for the electrochromic switching measurements of Example XII.
Figure 10:
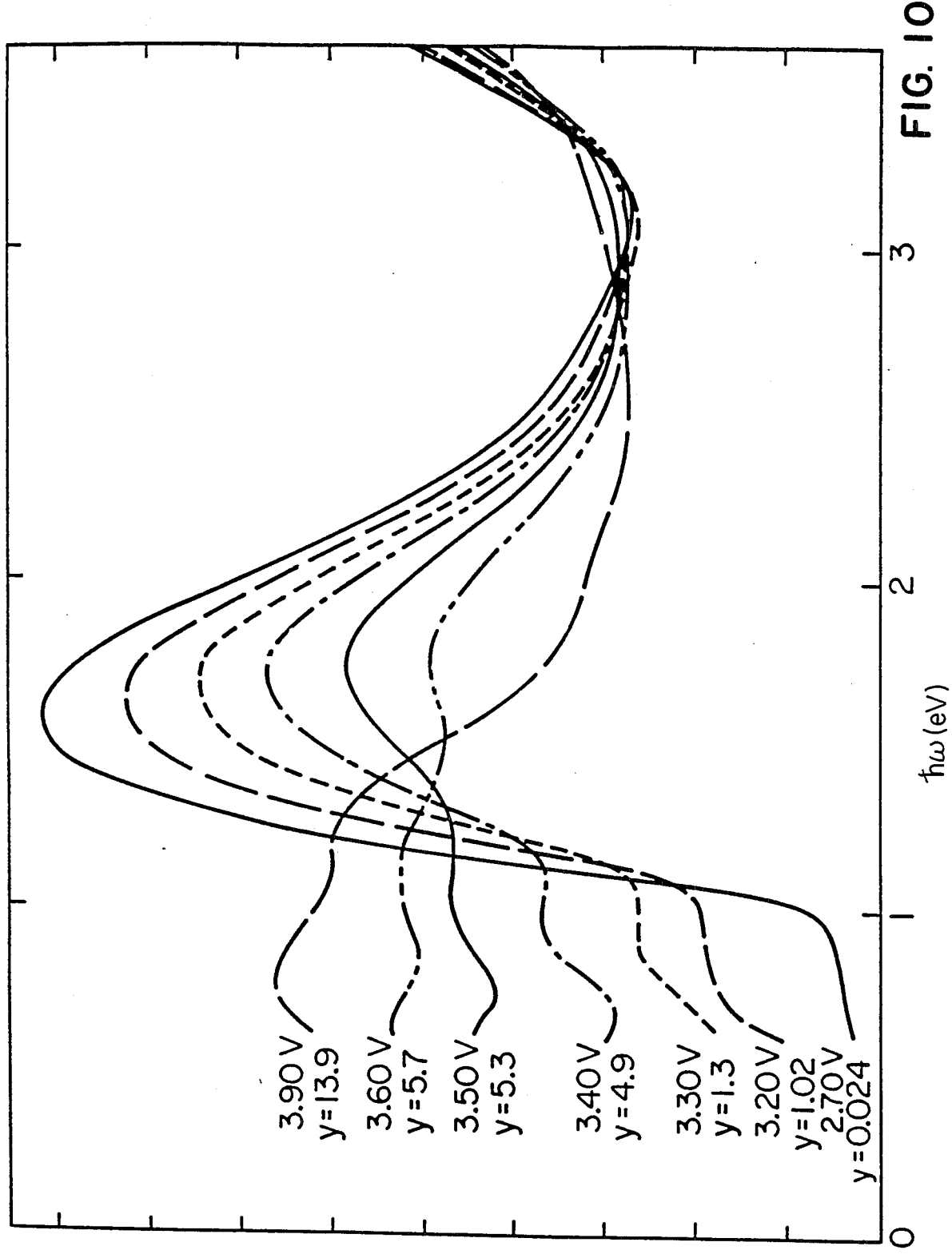
FIG. 10 is a graph showing the optical absorption data for polyisothianaphthene for a series of applied cell voltages (versus Li) and associated ClO$_4$ doping levels.

Following the application of a square voltage pulse, both the electrical response and the optical response were measured; see FIG. 9. The cell current was measured by the voltage drop across the series resistance. The optical response was measured by detecting the change in transmitted light at 650 nm (where the change in absorption coefficient is near maximum; see FIG. 10). The data were obtained using standard techniques with a tungsten lamp and monochromator as source and a photomultiplier as detector. The applied voltage pulse width was 25 seconds with 25 seconds of rest time between successive pulses.

Figure 11A:
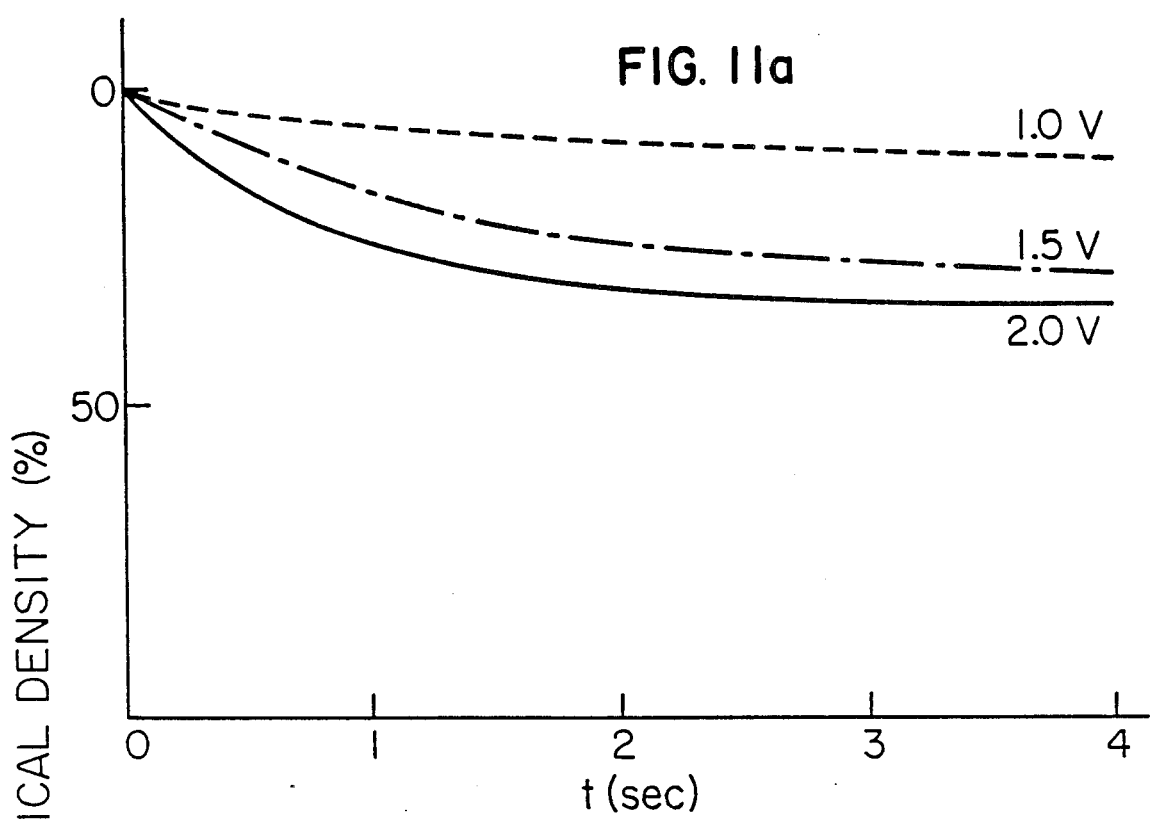
FIG. 11a is a graph showing fractional changes in optical density at hω=eV as a function of time for different applied voltages.
Figure 11B:
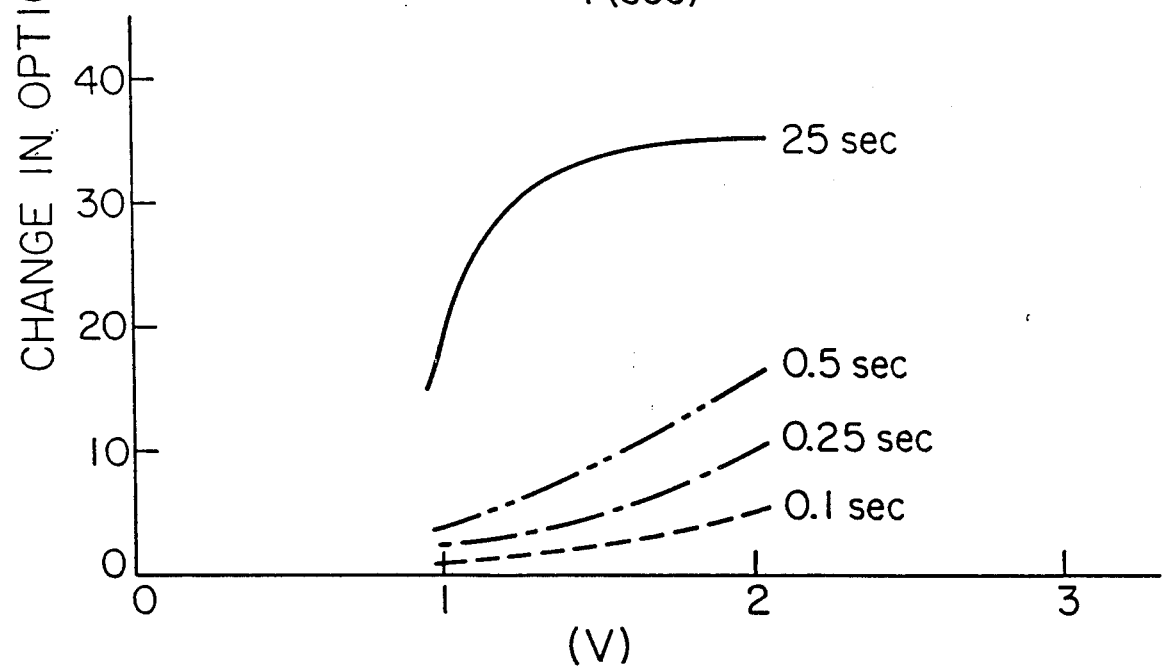
FIG. 11b illustrates typical percent changes in optical density versus applied voltage at various times after application of the switching voltage.

The typical changes in optical density in response to an applied voltage pulse are shown in FIG. 11. The optical density decreases (as expected from the data of FIG. 9) and saturates at a new (voltage dependent) value after a few seconds, as shown in FIG. 11a. The corresponding changes in optical density as a function of the magnitude of the voltage pulse are shown (at various sampling times) in FIG. 11b. In order to understand the various factors which determined the electrochromic switching time, we have studies (and describe in the following paragraphs) the characteristic response of PITN as a function of a number of relevant variables. Since the data of FIG. 11 show saturation after several seconds, the normalized change in optical density, $a(t)$, was plotted in order to allow relatively easy comparison of the response under different conditions. The normalized response function, $a(t)$, will increase from zero at $t=0$ to unity at long times (see FIG. 11a).

Figure 12:
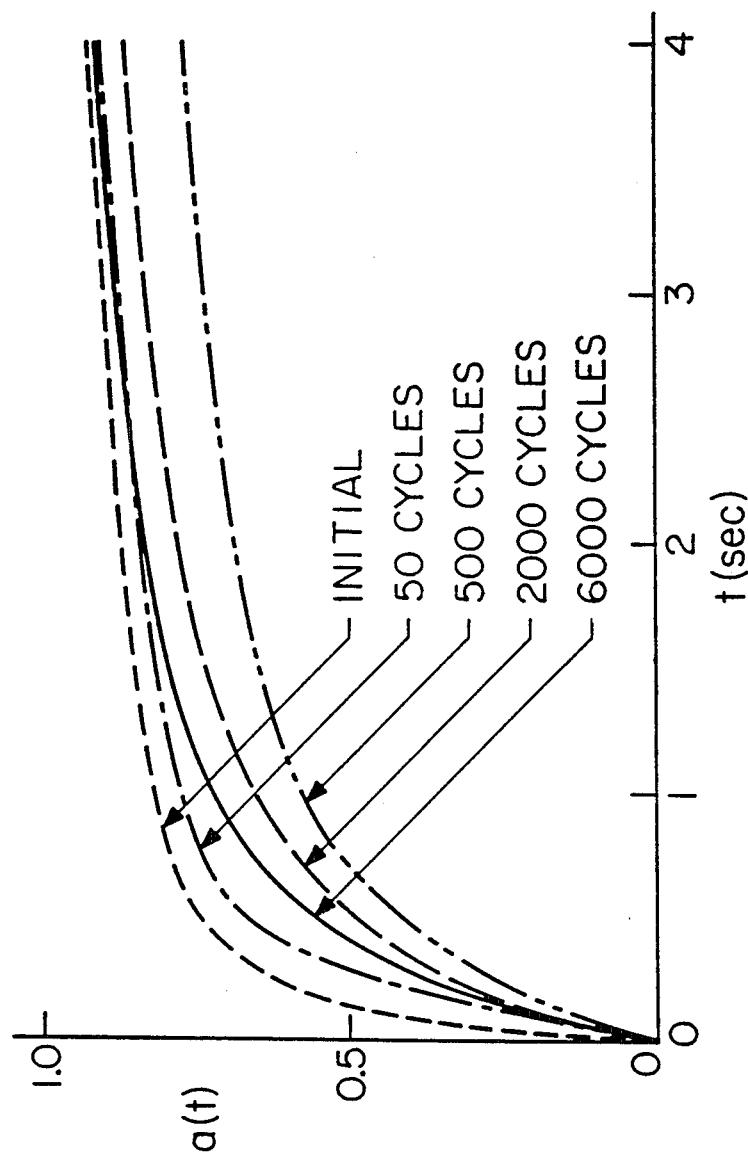
FIG. 12 is a graph showing the effect of repeated cycling on optical response.

The effect of repeated cycling is shown in FIG. 12, where we plot the normalized response, $a(t)$, as a function of time after the application of a 2V pulse to a sample with 2.9 cm² area. After the fast initial response (in the first cycle, $a(t)$ rises to 0.5 in about 100 milliseconds), there is a break-in period during which the curves become more rounded with a slower initial rise. After several hundred cycles, the curves stabilize and follow the dependence shown for cycle 6000 on FIG. 12. At that point, the characteristic switching time is about 0.3 to 0.5 seconds. Some minor variations in the data were found from sample to sample. In other experiments, the time response actually improved monotonically in cycling with the initial cycle giving the slowest response. We have monitored the time response for a number of samples over 6000 cycles in order to look for signs of degradation. The results shown in FIG. 12 are typical; after a few hundred cycles, the electrochromic switching characteristics stabilized with no indication of degradation.

Figure 13:
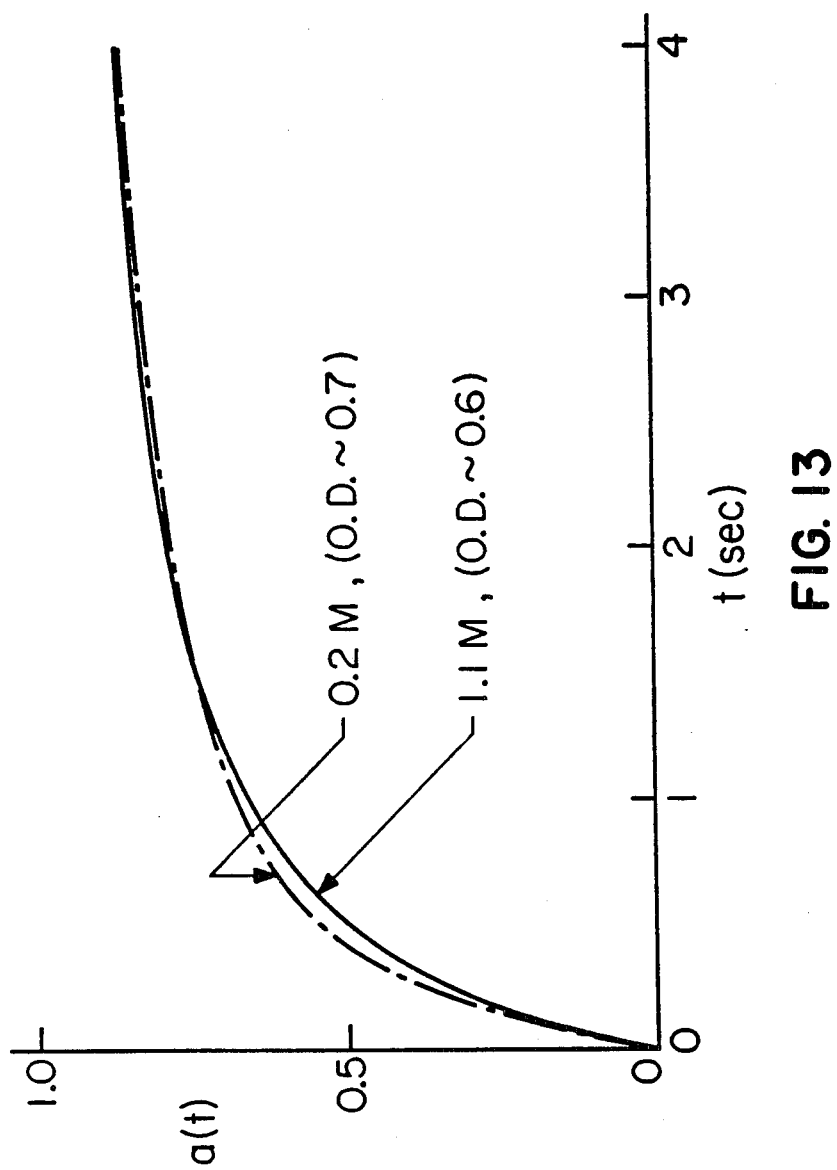
FIG. 13 is a graph of electrolyte concentration versus switching response (the two curves are each for the 50th cycle).

The electrochromic switching kinetics were not limited by the cell resistance. In FIG. 13, we show that the response is independent of the electrolyte concentration. We have also checked for effects due to the electrode resistance by using indium/tin oxide glass (resistance of 30 ohms per square) and low resistance gold evaporated glass as substrates. Although we found that the gold substrates typically gave lightly better results, any effect is relatively minor.

Figure 14:
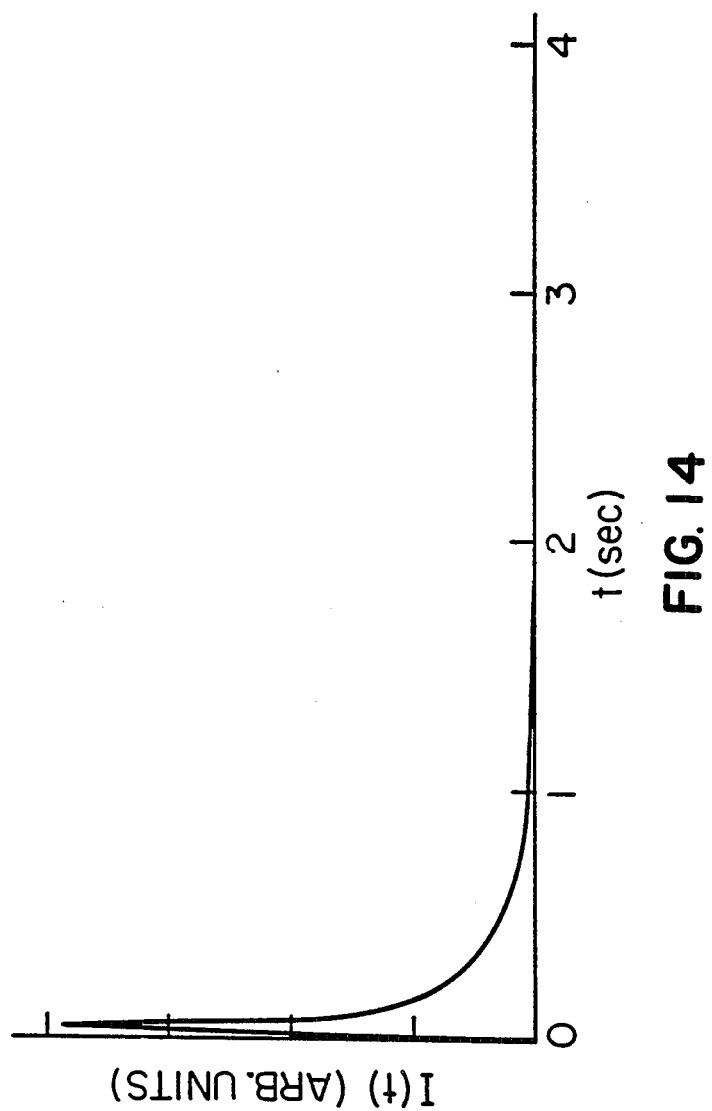
FIG. 14 illustrates the typical time response of cell current after application of the switching voltage.

The electrochromic switching arises from the changes in electronic structure of PITN which occur upon doping. To correlate the changes in optical density with doping, we have monitored the cell current and compared the charge delivered (as obtained from integrating the cell current) with the optical response. The typical current response versus time is shown in FIG. 14. Note that the current decays rapidly indicating that all the charge is delivered to the PITN electrode during a time which is short compared to the electrochromic switching time. We interpret these results as indicating that the electrochromic switching of PITN involves two steps; charge is first rapidly delivered to the surface of the PITN electrode and subsequently diffuses more slowly into the bulk. The diffusion into the polymer is the rate-limiting step. In order to verify that the switching characteristics are not current-limited, we compare in FIG. 15 the response (6000th cycle) of two PITN films with significantly different areas, but with all other features of the cell construction the same in the two cases. The absence of any significant effect demonstrates that charge delivery to the PITN electrode is not rate-limiting; the switching characteristics are determined by the properties of the PITN electrode.

The results of this study of the electrochromic switching phenomena in polyisothianaphthene illustrate reversible electrochromism with a characteristic switching time of a few hundred milliseconds. The experimental results demonstrate that the rate-limiting step in the electrochromic switching process involves diffusion of the dopant counterions into the polymer structure. the microstructure of PITN (and its relation to the electrochromic switching) was studied via electron microscopy, which showed that the polymer had a very open morphology with the honeycomb-like features made up of fibrillar subunits with diameter of about 20 Å. This open morphology is consistent with the relatively rapid doping kinetics and the associated electrochromism of PITN.

EXAMPLE XIII

Test of Use as Battery

The polyisothianaphthene film obtained in Examples 4-1 was cut into pieces 1 cm wide and 3 cm long. One end of the sample piece was attached to a platinum wire using a conductive adhesive, and this sample piece was arranged on each of both surfaces of a lithium foil of the same size via a 1 mm thick porous polypropylene partitioning membrane in such a manner that an electrolytic solution could sufficiently infiltrate thereinto. The system was then dipped in a propylene carbonate solution containing 0.5 mol/l of lithium parchlorate to a depth of 2 cm. The battery thus prepared wherein the polyisothianapththene was used as a cathode and the lithium foil as an anode was charged at a charging current of 2.0 mA/cm² for 30 minutes in an argon atmosphere. Completion of charging was immediately followed by discharging at a current of 2.0 mA/cm². When the voltage of the battery fell to 1V, charging was again performed under the same conditions as described above. The charge-discharge operation was repeated until the charge-discharge efficiency was reduced to 50% (590 repetitions). The charge-discharge efficiency on the 5th repetition was 99%. Furthermore, after standing for 48 hours, the self-discharging rate was about 3.2%.

We claim:

1. An electrochromic display wherein a high molecular weight conductive membrane formed on a conductive transparent base is used as a display base and an opposing electrode is arranged thereunder via a liquid electrolyte, said high molecular weight conductive membrane comprising a polymer having an isothianaphthene structure and capable of being reversibly oxidized or reduced.

2. The electrochromic display of claim 1 wherein said isothianaphthene polymer has a structural formula selected from the group consisting of (Ia) and (Ib):

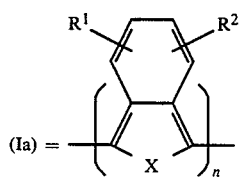

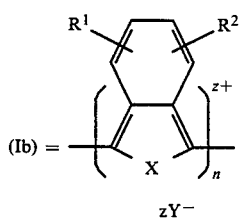

wherein said R¹ and R² are selected independently from the group consisting of hydrogen atoms and hydrocarbon residues having 1 to 5 carbon atoms, with the proviso that said R¹ and R² may link together to form, along with the benzene ring, a fused ring which is naphthalene; said X is selected from the group consisting of sulfur, selenium and tellurium; said Y⁻ represents an anion of an electrolyte; said z represents a number from 0.01 to 1 showing a ratio of the anion per mole of a monomer; and said n represents a number of from 5 to 500 showing a degree of polymerization.

3. The electrochromic display of claim 2 wherein X is sulfur.

4. The electrochromic display of claim 3 wherein R¹ and R² are both hydrogen.

5. The electrochromic display of claim 2 wherein R¹ and R² are selected independently from the group consisting of hydrogen, methyl and ethyl.

6. The electrochromic display of claim 2 wherein R¹ and R² are selected independently from the group consisting of hydrogen, methyl, methoxy and thiomethyl.

7. The electrochromic display of claim 2 wherein said polymer has the structure of formula (Ib) and X is sulfur.

8. The electrochromic display of claim 7 wherein Y⁻ is selected from the group consisting of Cl⁻, Br⁻, I⁻, ClO₄⁻, BF₄⁻, PF₆⁻, AsF₆⁻, SbF₆⁻, AlCl₄⁻, AlBr₄⁻, FeCl₄⁻ and CF₃SO₃⁻.

9. The electrochromic display of claim 7 wherein Y⁻ is HSO₄⁻.

10. The electrochromic display of claim 1 wherein z represents a number from 0 to 0.40.

11. The electrochromic display of claim 2 wherein said polymer membrane is formed on said display base by electrochemical polymerization thereon of a compound having the formula

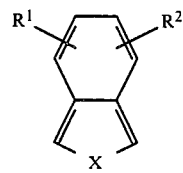

12. The electrochromic display of claim 1 wherein the thickness of said polymer membrane is from about 0.03 to about 30 μm.

13. The electrochromic display of claim 12 wherein the thickness of said polymer membrane is from about 0.05 to about 22 μm.

14. The electrochromic display of claim 13 wherein the thickness of said polymer membrane is from about 0.1 to about 10 μm.

15. The electrochromic display of claim 1 wherein said liquid electrolyte is a dispersion or solution comprising a supporting electrolyte in a solvent.

16. The electrochromic display of claim 15 wherein said supporting electrolyte comprises at least one compound of the formula Z⁺Y⁻ wherein Z is a cation selected from the group consisting of alkali metal, quaternary ammonium, phosphonium, carbonium, pyrylium and pyridinium ions. and wherein Z is an anion selected from the group consisting of Cl⁻, Br⁻, I⁻, ClO₄⁻, BF₄⁻, PF₆⁻, AsF₆⁻, SbF₆⁻, AlCl₄⁻, AlBr₄⁻, FeCl₄⁻ and CF₃SO₃⁻, HSO₄⁻ and HF₂⁻.

17. The electrochromic display of claim 15 wherein said solvent is a nonaqueous organic solvent.

18. The electrochromic display of claim 17 wherein said solvent is aprotic and has a high dielectric constant.

19. The electrochromic display of claim 18 wherein said solvent is selected from the group consisting of ethers, ketones, nitriles, amines, amides, sulfur compounds, phosphoric ester compounds, phosphorous ester compounds, boric ester compounds, chlorinated hydrocarbons, esters, carbonates, nitro compounds and combinations thereof.

20. The electrochromic display of claim 19 wherein said solvent is selected from the group consisting of tetrahydrofuran, 2-methyltetrahydrofuran, 1,4-dioxane, acetonitrile, proprionitrile, 4-methyl-2-pentanone, butyronilrile, valeronitrile, benzonitrile. 1,2-dichloroethane, γ-butyrolactone, valerolactone, dimethoxyethane, methylformate, propylene carbonate, ethylene carbonate, dimethylformamide, dimethyl sulfoxide, ethyl phosphate, methyl phosphate, ethyl phosphite, methyl phosphite, 3-methylsulfolane, and combinations thereof.

21. The electrochromic display of claim 15 wherein the concentration of said support electrolyte in said solvent is from about 0.001 to about 10 mole/l.

22. The electrochromic display of claim 1 wherein said polymer membrane is spaced apart from said opposing electrode at a distance of from about 0.05 to about 5 mm.

23. An electrode comprising a support member coated with polyisothianaphthene.

24. A battery comprising an anode and a polyisothianaphthene-coated cathode separated from the anode by a porous partitioning membrane.

25. A solar energy conversion device having a surface membrane material that is rendered conductive upon absorption of light, the surface membrane material comprising polyisothianaphthene.

* * * * *

UNITED STATES PATENT AND TRADEMARK OFFICE
CERTIFICATE OF CORRECTION

PATENT NO. : 4,772,940
DATED : September 20, 1988
INVENTOR(S) : Fred Wudl, et al It is certified that error appears in the above-identified patent and that said Letters Patent is hereby corrected as shown below:

On the title page, the following should be inserted after item [63].

[30] Foreign Application Priority Data

June 15, 1984  [JP]  Japan..............59-121956

Signed and Sealed this

Twenty-first Day of March, 1989

Attest:

DONALD J. QUIGG

*Attesting Officer*  *Commissioner of Patents and Trademarks*